United States Patent [19]

Toyoshima et al.

[11] Patent Number: 4,954,586

[45] Date of Patent: Sep. 4, 1990

[54] SOFT OCULAR LENS MATERIAL

[75] Inventors: Nobuyuki Toyoshima; Takanori Shibata; Atsushi Hirashima; Ichiro Ando; Noriko Iwata, all of Nagoya; Hiroshi Yoshioka, Annaka; Akinari Itagaki, Annaka; Toshio Yamazaki, Annaka, all of Japan

[73] Assignees: Menicon Co., Ltd, Aichi; Shin-Etsu Chemical Co., Ltd., Tokyo, both of Japan

[21] Appl. No.: 460,662

[22] Filed: Jan. 3, 1990

[30] Foreign Application Priority Data

Jan. 17, 1989 [JP] Japan .................................. 1-8845
Feb. 15, 1989 [JP] Japan .................................. 1-35218
Jul. 11, 1989 [JP] Japan .................................. 1-178500

[51] Int. Cl.$^5$ .............................................. C08F 18/20
[52] U.S. Cl. .................................... 526/245; 526/279; 523/107
[58] Field of Search ............... 526/245, 279; 523/107

[56] References Cited

U.S. PATENT DOCUMENTS 4,525,563  6/1985  Shibata et al. ................. 526/245
4,743,667  5/1988  Mizutani et al. ................ 526/245

FOREIGN PATENT DOCUMENTS 63-105015  5/1988  Japan ............................. 526/245

Primary Examiner—Joseph L. Schofer
Assistant Examiner—N. Sarofim
Attorney, Agent, or Firm—Oblon, Spivak, McClelland, Maier & Neustadt

[57] ABSTRACT

A soft ocular lens material is formed of a copolymer consisting essentially of:
  (A) from 5 to 70 parts by weight of a fluorine containing (meth)acrylate;
  (B) from 5 to 60 parts by weight of an alkyl (meth)acrylate;
  (C) from 3 to 45 parts by weight of a polysiloxane macromonomer having polymerizable groups at both terminals; and
  (D) from 3 to 40 parts by weight of a polysiloxane macromonomer having polymerizable groups bonded via one or two urethane bonds to the siloxane main chain.

11 Claims, No Drawings

SOFT OCULAR LENS MATERIAL

The present invention relates to a soft ocular lens material. More particularly, the present invention relates to a soft ocular lens material useful for contact lenses, intraocular lenses or artificial cornea.

Various ocular lens materials have been proposed as contact lens materials or intraocular lens materials. Such ocular lens materials are generally classified into soft materials and hard materials. It is generally well known that soft materials are preferred as materials for contact lenses giving comfortable feeling to wearers, or as materials for intraocular lenses which can be readily inserted in a deformed shape through a small incision of the eye ball without damaging eye tissues.

Soft materials are classified into water-absorptive materials which swell and soften upon absorption of water, and substantially non-water absorptive materials.

The water absorptive materials have a drawback that they are inferior in the mechanical strength since upon absorption of water, the proportion of the material itself is relatively small. Further, upon absorption of water, bacteria or fungi are likely to propagate in the materials. Therefore, when they are used as contact lenses, it will be required to periodically repeat a rather cumbersome operation such as boiling for sterilization.

As the substantially non-water absorptive materials, a silicone rubber material and a copolymer of an alkyl acrylate or a long chain alkyl methacrylate, or an esterification product of a copolymer of acrylic acid (hereinafter referred to generally as a (meth)acrylate soft material) may, for example, be mentioned.

The silicone rubber material has a merit that it has very high oxygen permeability. However, the surface of the obtained material has extremely strong water repellency and exhibits poor affinity to the cornea or other ocular tissues. It has been reported that some of the products prepared by using this material as a material for contact lenses, have induced serious troubles to the ocular tissues.

Japanese Unexamined Patent Publications Nos. 102914/1984 and 297411/1988 propose as a contact lens material a polymer composed of a cross-linked polymer product of a polysiloxane macromonomer having polymerizable groups bonded via e.g. urethane bonds to a polysiloxane, with a hydrophilic monomer. Such a material has strength improved to some extent, but when the amount of the polysiloxane is small, it is difficult to obtain a product having adequate oxygen permeability, and if it is attempted to use a polysiloxane having a longer siloxane chain to increase the oxygen permeability, the compatibility with other copolymer components tends to be poor, and it becomes difficult to obtain a material which is uniform and transparent and which has satisfactory mechanical strength. Further, if the polysiloxane is used in a large amount, the product tends to be easily stained with e.g. lipids. An attempt to copolymerize a fluorine monomer to provide resistance against such lipid stains does not work because of poor compatibility of the above polysiloxane with the fluorine monomer, whereby it is difficult to obtain a uniform and transparent polymer, and a such a polymer will be poor in the mechanical strength and its oxygen permeability will not be sufficiently high. In the above publications, there is no disclosure or suggestion of the use of a siloxane macromonomer containing no urethane bonds.

Further, Japanese Unexamined Patent Publication No. 229524/1984 proposes as a contact lens material a reaction product of a composition comprising an organopolysiloxane urethane acrylate and an ethylenically unsaturated comonomer. However, the contact lens material made of such a reaction product still has the same drawbacks as the contact lens material disclosed in the above-mentioned Japanese Unexamined Patent Publication No. 102914/1984. In this publication, there is no disclosure or suggestion of the use of a siloxane macromonomer containing no urethane bonds.

In addition to the above-mentioned publications, for example, Japanese Examined Patent Publication No. 28329/1985 proposes to use as a contact lens material a polysiloxane obtained by polymerizing a polyorganosiloxane monomer with a comonomer. The material in which such a polysiloxane is employed, has good oxygen permeability, but does not have adequate mechanical strength and is brittle as its drawback. In this publication, there is no disclosure or suggestion of a polysiloxane containing urethane bonds.

Among the above-mentioned (meth)acrylate soft materials, those using a copolymer composed essentially of butyl acrylate, as the base material, are practically used for contact lenses. However, the contact lenses made of such material have a tacky surface, and lipid stains are likely to adhere thereon, whereby the lenses are likely to have white turbidity. Further, the oxygen permeability is not so high, and the mechanical strength is not fully satisfactory. Thus, they have a number of properties which are still to be improved.

With respect to the (meth)acrylate soft materials, in addition to those mentioned above, there has been proposed a non-water absorptive soft contact lens made of a copolymer prepared by using an acrylate, a methacrylate and a cross-linkable monomer having a cyclic structure in its molecule and at least two functional groups, wherein the number of atoms present between the cyclic structure and the functional groups is at least 2 (Japanese Unexamined Patent Publication No. 127812/1987). Such a non-water absorptive soft contact lens has improved mechanical strength and flexibility, but it is susceptible to lipid stains, and the oxygen permeability is not adequate for a contact lens capable of being continuously worn.

Further, other than the above, a non-water absorptive soft contact lens made of a copolymer prepared by a fluorine-containing methacrylate, a methacrylate, an acrylate and a cross-linkable monomer other than those mentioned above, has been disclosed (Japanese Unexamined Patent Publication No. 127824/1987), and a process for producing a non-water absorptive oxygen permeable soft contact lens obtained by esterification treatment, with a fluorine-containing alcohol, of a hard copolymer obtained by copolymerizing a monomer mixture containing acrylic acid and/or methacrylic acid and a cross linkable monomer, has been proposed (Japanese Unexamined Patent Publication No. 127825/1987). The contact lenses disclosed in these publications each has the mechanical strength improved to some extent, and the oxygen permeability is good to some extent. However, they have a drawback that when the cross-linkable monomer is used in a larger amount to improve the mechanical strength, the oxygen permeability tends to be low, the flexibility tends to be poor, and the material tends to be brittle.

In view of such conventional techniques, the present inventors have conducted extensive researches to obtain a soft ocular lens material which (1) has excellent transparency, (2) exhibits substantially no water absorptivity or low water absorptivity, (3) is free from tackiness of its surface and resistant against lipid stains, (4) is excellent in the oxygen permeability, and (5) has practically adequate mechanical strength. As a result, they have found for the first time an ocular lens material satisfying all of such physical properties. The present invention has been accomplished on the basis of this discovery.

In the present specification, substantially no water absorptivity or low water absorptivity means that the water absorptivity of the material is not higher than 5%.

The present invention provides a soft ocular lens material made of a copolymer consisting essentially of:

(A) from 5 to 70 parts by weight of a fluorine-containing (meth)acrylate;

(B) from 5 to 60 parts by weight of an alkyl (meth)acrylate;

(C) from 3 to 45 parts by weight of a polysiloxane macromonomer having polymerizable groups at both terminals, of the formula I:

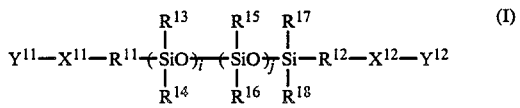

wherein each of $Y^{11}$ and $Y^{12}$ independently represents an acryloyl group, a methacryloyl group, a vinyl group or an allyl group; each of $X^{11}$ and $X^{12}$ independently represents a covalent bond, an oxygen atom or an alkylene glycol group; each of $R^{11}$ and $R^{12}$ independently represents a linear or branched alkylene group having from 1 to 6 carbon atoms; each of $R^{13}$, $R^{14}$, $R^{15}$, $R^{16}$, $R^{17}$ and $R^{18}$ independently represents an alkyl group having from 1 to 3 carbon atoms or a phenyl group; i is an integer of from 1 to 1500; and j is an integer of from 0 to 1499 (provided that i+j is at most 1500); and (D) from 3 to 40 parts by weight of a polysiloxane macromonomer having polymerizable groups bonded via one or two urethane bonds to the siloxane main chain, of the formula II:

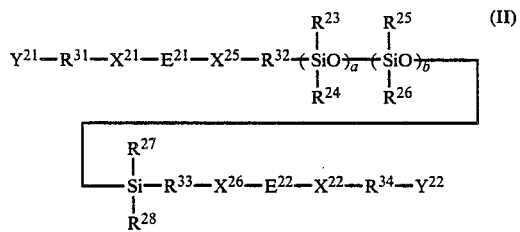

wherein each of $Y^{21}$ and $Y^{22}$ independently represents a group selected from the group consisting of an acryloyloxy group, a methacryloyloxy group, a vinyl group and an allyl group; each of $R^{31}$ and $R^{34}$ independently represents a linear or branched alkylene group having from 2 to 6 carbon atoms; each of $X^{21}$ and $X^{22}$ independently represents a covalent bond, an oxygen atom or an alkylene glycol group; each of $R^{32}$ and $R^{33}$ independently represents a linear or branched alkylene group having from 1 to 6 carbon atoms; each of $R^{23}$, $R^{24}$, $R^{25}$, $R^{26}$, $R^{27}$ and $R^{28}$ independently represents an alkyl group having from 1 to 3 carbon atoms or a phenyl group; each of $E^{21}$ and $E^{22}$ independently represents —NHCO— (provided that in this case, each of $X^{21}$ and $X^{22}$ is a covalent bond, $E^{21}$ forms a urethane bond together with $X^{25}$, and $E^{22}$ forms a urethane bond together with $X^{26}$) or a bivalent group derived from a diisocyanate selected from the group consisting of saturated aliphatic, alicyclic and aromatic diisocyanates (provided that in this case, each of $X^{21}$ and $X^{22}$ independently represents an oxygen atom or an alkylene glycol group, $E^{21}$ forms a urethane bond together with $X^{21}$ and $X^{25}$, and $E^{22}$ forms a urethane bond together with $X^{22}$ and $X^{26}$); each of $X^{25}$ and $X^{26}$ independently represents an oxygen atom, an alkylene glycol or a group represented by the formula V:

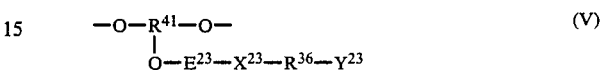

wherein $R^{41}$ is a trivalent hydrocarbon group having from 1 to 6 carbon atoms; $Y^{23}$ represents a group selected from the group consisting of an acryloyloxy group, a methacryloyloxy group, a vinyl group and a allyl group; $R^{36}$ represents a linear or branched alkylene group having from 2 to 6 carbon atoms; $X^{23}$ represents a covalent bond, an oxygen atom or an alkylene glycol group; $E^{23}$ represents —NHCO— (provided that in this case, $X^{23}$ is a covalent bond( or a bivalent group derived from a diisocyanate selected from the group consisting of saturated aliphatic, alicyclic and aromatic diisocyanates (provided that in this case, $X^{23}$ is an oxygen atom or an alkylene glycol group), which forms a urethane bond together with $X^{23}$ and the adjacent oxygen atom bonded to $R^{41}$; a is an integer of from 1 to 1500; and b is an integer of from 0 to 1499, provided $a+b \leq 1500$; as essential copolymer components.

Now, the present invention will be described in detail with reference to the preferred embodiments.

As mentioned above, the soft ocular lens material of the present invention is made of a copolymer consisting essentially of (A) a fluorine-containing (meth)acrylate (hereinafter referred to as monomer (A)), (B) an alkyl (meth)acrylate (hereinafter referred to as monomer (B)), (C) a polysiloxane macromonomer of the formula I as defined above (hereinafter referred to as macromonomer (C)) and (D) a polysiloxane macromonomer of the formula II as defined above (hereinafter referred to as macromonomer (D)), as essential copolymer components.

The macromonomer (D) includes macromonomers of the following formulas VII, VIII and IX:

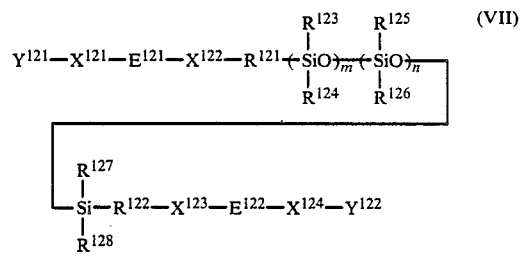

wherein each of $Y^{121}$ and $Y^{122}$ independently represents an acryloyl group, a methacryloyl group, a vinyl group or an allyl group; each of $X^{121}$, $X^{122}$, $X^{123}$ and $X^{124}$ independently represents an oxygen atom or an alkylene glycol group; each of $R^{121}$ and $R^{122}$ independently represents a linear or branched alkylene group having from 1 to 6 carbon atoms; each of $R^{123}$, $R^{124}$, $R^{125}$, $R^{126}$, $R^{127}$ and $R^{128}$ independently represents an alkyl group having from 1 to 3 carbon atoms or a phenyl group; each of $E^{121}$ and $E^{122}$ independently represents a bivalent group derived from a saturated aliphatic, alicyclic or aromatic diisocyanate, and $E^{121}$ forms a urethane bond together with $X^{121}$ and $X^{122}$, and $E^{122}$ forms a urethane bond together with $X^{123}$ and $X^{124}$; m is an integer of from 1 to 1500; and n is an integer of from 0 to 1499 (provided m+n is not more than 1500);

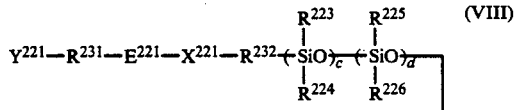
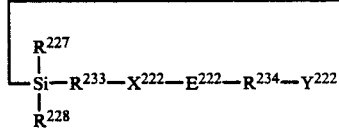

wherein each of $Y^{221}$ and $Y^{222}$ independently represents an acryloyloxy group, a methacryloyloxy group, a vinyl group or an allyl group, each of $R^{231}$ and $R^{234}$ independently represents a linear or branched alkylene group having from 2 to 6 carbon atoms; each of $X^{221}$ and $X^{222}$ independently represents an oxygen atom or an alkylene glycol group; each of $R^{232}$ and $R^{233}$ independently represents a linear or branched alkylene group having from 1 to 6 carbon atoms; each of $R^{223}$, $R^{224}$, $R^{225}$, $R^{226}$, $R^{227}$ and $R^{228}$ independently represents an alkyl group having from 1 to 3 carbon atoms or a phenyl group; each of $E^{221}$ and $E^{222}$ independently represents —NHCO—; c is an integer of from 1 to 1500; and d is an integer of from 0 to 1499, provided c+d is not more than 1500; and

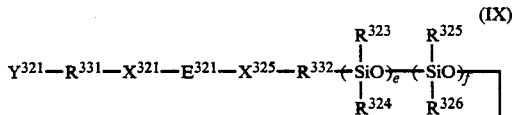
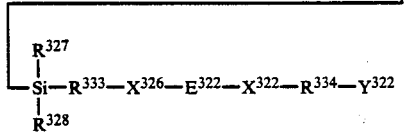

wherein each of $Y^{321}$ and $Y^{322}$ independently represents a group selected from the group consisting of an acryloyloxy group, a methacryloyloxy group, a vinyl group and an allyl group; each of $R^{331}$ and $R^{334}$ independently represents a linear or branched alkylene group having from 2 to 6 carbon atoms; each of $X^{321}$ and $X^{322}$ independently represents a covalent bond, an oxygen atom or an alkylene glycol group; each of $R^{332}$ and $R^{333}$ independently represents a linear or branched alkylene group having from 1 to 6 carbon atoms; each of $R^{323}$, $R^{324}$, $R^{325}$, $R^{326}$, $R^{327}$ and $R^{328}$ independently represents an alkyl group having from 1 to 3 carbon atoms or a phenyl group; each of $E^{321}$ and $E^{322}$ independently represents —NHCO— (provided that in this case, each of $X^{321}$ and $X^{322}$ is a covalent bond, and $E^{321}$ forms a urethane bond together with $X^{325}$, and $E_{322}$ forms a urethane bond together with $X^{326}$) or a bivalent group derived from a diisocyanate selected from the group consisting of saturated aliphatic, alicyclic and aromatic diisocyanates (provided that in this case, each of $X^{321}$ and $X^{322}$ independently represents an oxygen atom or an alkylene glycol group, and $E^{321}$ forms a urethane bond together with $X^{321}$ and $X^{325}$, and $E^{322}$ forms a urethane bond together with $X^{322}$ and $X^{326}$); each of $X^{325}$ and $X^{326}$ independently represents a group of the formula V as defined above; e is an integer of from 1 to 1500 and f is an integer of from 0 to 1499, provided e+f≦1500.

The above monomer (A) is a component which provides a function of stain resistance against e.g. lipid stains without reducing the oxygen permeability of the material. As a typical example of such monomer (A), a monomer represented by the formula III:

$$CH_2=CR^7COOC_pH_{(2p-q-r+)}F_q(OH)_r \qquad (III)$$

wherein $R^7$ represents a hydrogen atom or a methyl group, p is an integer of from 1 to 15, q is an integer of from 1 to (2p+1), and r is an integer of from 0 to 2, may, for example, be mentioned. Specific examples of such a monomer include, for example, 2,2,2-trifluoroethyl (meth)acrylate, 2,2,3,3-tetrafluoropropyl (meth)acrylate, 2,2,3,3-tetrafluoro-t-pentyl (meth)acrylate, 2,2,3,4,4,4-hexafluorobutyl (meth)acrylate, 2,2,3,4,4,4-hexafluoro-t-hexyl (meth)acrylate, 2,3,4,5,5,5-hexafluoro-2,4-bis(trifluoromethyl)pentyl (meth)acrylate, 2,2,3,3,4,4-hexafluorobutyl (meth)acrylate, 2,2,2,2′,2′,2′-hexafluoroisopropyl (meth)acrylate, 2,2,3,3,4,4,4-heptafluorobutyl (meth)acrylate, 2,2,3,3,4,4,5,5-octafluoropentyl (meth)acrylate, 2,2,3,3,4,4,5,5,5-nonafluoropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate, 2,2,3,3,4,4,5,5,6,6,7,7,7-tridecafluoroheptyl (meth)acrylate, 3,3,4,4,5,5,6,6,7,7,8,8,9,9,10,10-hexadecafluorodecyl (meth)acrylate, 3,3,4,4,5,5,6,6,7,7,8,8,9,9,10,10,10-heptadecafluorodecyl (meth)acrylate, 3,3,4,4,5,5,6,6,7,7,8,8,9,9,10,10,11,11-octadecafluoroundecyl (meth)acrylate, 3,3,4,4,5,5,6,6,7,7,8,8,9,9,10,10,11,11,11-nonadecafluoroundecyl (meth)acrylate, 3,3,4,4,5,5,6,6,7,7,8,8,9,9,10,10,11,11,12,12-eicosafluorododecyl (meth)acrylate, 2-hydroxy-4,4,5,5,6,7,7,7-octafluoro-6-trifluoromethylheptyl (meth)acrylate, 2-hydroxy-4,4,5,5,6,6,7,7,8,9,9,9-dodecafluoro-8-trifluoromethylnonyl (meth)acrylate and 2-hydroxy-4,4,5,5,6,6,7,7,8,8,9,9,10, 11,11,11-hexadecafluoro-10-trifluoromethylundecyl (meth)acrylate.

The above monomer (A) is incorporated in an amount of from 5 to 70 parts by weight, preferably from 10 to 60 parts by weight, more preferably from 30 to 50 parts by weight, per 100 parts by weight of the total amount of the above-mentioned essential copolymer components. If the amount of the monomer (A) is less than the lower limit of the above range, no adequate effects by the incorporation of the monomer (A) will be obtained, and the resulting lens material tends to be susceptible to stains such as lipid stains. Not only that, the mechanical strength tends to be low. On the other hand, if the amount exceeds the above upper limit, the amounts of other essential copolymer components (monomer (B) and macromonomers (C) and (D)) will be relatively small, whereby the resulting material tends to be poor in the flexibility, the elongation tends to be small, and the material tends to be brittle. Further, in such a case, the oxygen permeability of the resulting material tends to be inadequate, and the compatibility of the monomer (A) with other copolymer components, tends to be poor, whereby it becomes difficult to obtain a material which is uniform and transparent, and which has satisfactory mechanical strength.

The monomer (B) is a component which imparts proper flexibility to the ocular lens material and which improves the compatibility with other essential copolymer components. Specific examples of such monomer (B) includes, for example, straight chain, branched chain and cyclic alkyl (meth)acrylates such as methyl (meth)acrylate, ethyl (meth)acrylate, propyl (meth)acrylate, isopropyl (meth)acrylate, butyl (meth)acrylate, tert-butyl (meth)acrylate, isobutyl (meth)acrylate, pentyl (meth)acrylate, tert-pentyl (meth)acrylate, hexyl (meth)acrylate, heptyl (meth)acrylate, octyl (meth)acrylate, 2-ethylhexyl (meth)acrylate, nonyl (meth)acrylate, decyl (meth)acrylate, dodecyl (meth)acrylate, stearyl (meth)acrylate, cyclopentyl (meth)acrylate, and cyclohexyl (meth)acrylate.

Among the above monomers (B), an alkyl (meth)acrylate, of which the glass transition temperature (hereinafter referred to as Tg) of a homopolymer would be not higher than 40° C., is particularly preferably used in the present invention, since it has a merit such that the flexibility of the ocular lens material thereby obtained can properly be adjusted. Here, the molecular weight of the homopolymer is preferably at least about 10,000. Because if the molecular weight of the homopolymer is at least 10,000, Tg of such a homopolymer does not depend on such a molecular weight and does not substantially change.

The above monomer (B) is incorporated in an amount of from 5 to 60 parts by weight, preferably from 10 to 50 parts by weight, more preferably from 20 to 40 parts by weight, relative to 100 parts by weight of the total amount of the essential copolymer components. If the amount is less than the above lower limit, no adequate effects by the incorporation of the monomer (B) will be obtained, and not only the flexibility of the resulting material will be low, but also the compatibility among the essential copolymer components tends to be poor, whereby it tends to be difficult to obtain a material which is uniform and transparent and which has adequate mechanical strength. On the other hand, if the amount exceeds the above upper limit, the amounts of other essential copolymer components will correspondingly be small, whereby the effects of incorporating such other essential copolymer components tend to be poor, the oxygen permeability of the resulting material tends to be low, the material tends to be susceptible to stains such as lipid stains, and the surface tackiness tends to be remarkable.

The macromonomer (C) is a component which imparts excellent oxygen permeability to the ocular lens material and has polymerizable groups at both ends of the molecule. Such polymerizable groups are copolymerized with other lens components (copolymer components), whereby there will be no elution of the macromonomer (C) from the material.

As the macromonomer (C), the one represented by the formula I is used as mentioned above. In the formula I, each of $Y^{11}$ and $Y^{12}$ independently represents an acryloyl group, a methacryloyl group, a vinyl group or an allyl group, as mentioned above. Each of $X^{11}$ and $X^{12}$ independently represents a covalent bond, and oxygen atom or an alkylene glycol group. As such an alkylene glycol group, a group represented by the formula:

$$-O\!-\!(C_kH_{2k}\!-\!O)_l \qquad (IV)$$

wherein k is an integer of from 2 to 4, and l is an integer of from 1 to 5 may be used. In this formula, if l is an integer of 6 or higher, the oxygen permeability tends to decrease, or the mechanical strength tends to be low. Therefore, in the present invention, l is an integer of from 1 to 5, preferably from 1 to 3. Each of $R^{11}$ and $R^{12}$ independently represents a straight chain or branched chain alkylene group having from 1 to 6 carbon atoms. If such an alkylene group has 7 or more carbon atoms, the oxygen permeability tends to decrease. Particularly preferred carbon number of the alkylene group is from 1 to 3. Each of $R^{13}$, $R^{14}$, $R^{15}$, $R^{16}$, $R^{17}$ and $R^{18}$ independently represents an alkyl group having from 1 to 3 carbon atoms or a phenyl group. i is an integer of from 1 to 1500, and j is an integer of from 0 to 1499. However, if i+j exceeds 1500, the molecular weight of the macromonomer (C) tends to be too large, and the compatibility with other copolymer components tends to be poor, and it is likely that it will not adequately dissolve when mixed, white turbidity will form during the polymerization, and it tends to be difficult to obtain a uniform and transparent material. On the other hand, if i+j is 0, not only the oxygen permeability of the resulting material will be low, but also the flexibility tends to be poor. Therefore, i+j is from 1 to 1500, preferably from 3 to 500, more preferably from 5 to 100.

The macromonomer (C) is incorporated in an amount of from 3 to 45 parts by weight, preferably from 5 to 35 parts by weight, more preferably from 10 to 25 parts by weight, relative to 100 parts by weight of the total amount of the essential copolymer components. If the amount is less than the above-mentioned lower limit, no adequate effects of using the macromonomer (C) will be obtained, and not only the oxygen permeability of the resulting material will be inadequate, but the resiliency tends to be inadequate. On the other hand, if the amount exceeds the above-mentioned upper limit, the amounts of other components correspondingly decrease, whereby the resulting material tends to be poor in elongation and brittle, it will be susceptible to stains such as lipid stains, the compatibility with other essential copolymer components tends to be poor, and it becomes difficult to obtain a uniform and transparent material.

The macromonomer (D) has resilient bonds such as urethane bonds and reinforce the material by the siloxane moiety without impairing the flexibility and the oxygen permeability of the material. It imparts the resiliency (toughness or resilient elasticity) and eliminate brittleness as the material. Namely, it is a component which improves the mechanical strength.

The macromonomer (D) have polymerizable groups at both terminals of the molecule. By virtue of such polymerizable groups, it is copolymerized with other lens components (copolymer components), whereby it does not elute from the resulting soft ocular lens material. It has excellent properties such that it imparts to the soft ocular lens material not only physical reinforcing effects due to the interlocking of molecules, but also reinforcing effects due to chemical bonding.

As the macromonomer (D), the one represented by the formula II is employed as mentioned above. In the formula II, each of $Y^{21}$ and $Y^{22}$ independently represents a group selected from the group consisting of an acryloyloxy group, a methacryloyloxy group, a vinyl group and an allyl group, as mentioned above. Each of $R^{31}$ and $R^{34}$ independently represents a straight chain or branched chain alkylene group having from 2 to 6 carbon atoms, as mentioned above. Each of $R^{32}$ and $R^{33}$ independently represents a straight chain or branched chain alkylene group having from 1 to 6 carbon atoms, as mentioned above. Each of $R^{23}$, $R^{24}$, $R^{25}$, $R^{26}$, $R^{27}$ and $R^{28}$ represents an alkyl group having from 1 to 3 carbon atoms or a phenyl group, as mentioned above. Each of $E^{21}$ and $E^{22}$ independently represents —NHCO— (provided that in this case, each of $X^{21}$ and $X^{22}$ is a covalent bond, $E^{21}$ forms a urethane bond together with $X^{25}$, and $E^{22}$ forms a urethane bond together with $X^{26}$) or a bivalent group derived from a diisocyanate selected from the group consisting of saturated aliphatic, alicyclic and aromatic diisocyanates (provided that in this case, each of $X^{21}$ and $X^{22}$ independently represents an oxygen atom or an alkylene glycol group, $E^{21}$ forms a urethane bond together with $X^{21}$ and $X^{25}$, and $E^{22}$ forms a urethane bond together with $X^{22}$ and $X^{26}$) Each of $X^{21}$ and $X^{22}$ independently represents a covalent bond, an oxygen atom or an alkylene glycol group. As such an alkylene glycol group, a group of the formula IV:

$$-O\!+\!C_kH_{2k}\!-\!O\!+\!_l \qquad (IV)$$

wherein k is an integer of from 2 to 4, and l is an integer of from 1 to 5, may be used. In this formula, if l is an integer of 6 or higher, the oxygen permeability tends to decrease, or the mechanical strength tends to be low. Therefore, in the present invention, l is an integer of from 1 to 5, preferably from 1 to 3.

Each of $X^{25}$ and $X^{26}$ independently represents an oxygen atom, an alkylene glycol or a group represented by the formula V:

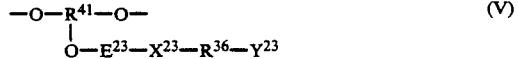

wherein $R^{41}$ is a trivalent hydrocarbon group having from 1 to 6 carbon atoms; $Y^{23}$ represents a group selected from the group consisting of an acryloyloxy group, a methacryloyloxy group, a vinyl group and a allyl group; $R^{36}$ represents a linear or branched alkylene group having from 2 to 6 carbon atoms; $X^{23}$ represents a covalent bond, an oxygen atom or an alkylene glycol group; $E^{23}$ represents —NHCO— (provided that in this case, $X^{23}$ is a covalent bond) or a bivalent group derived from a diisocyanate selected from the group consisting of saturated aliphatic, alicyclic and aromatic diisocyanates (provided that in this case, $X^{23}$ is an oxygen atom or an alkylene glycol group), which forms a urethane bond together with $X^{23}$ and the adjacent oxygen atom bonded to $R^{41}$.

The alkylene glycol group for $X^{25}$, $X^{26}$ and $X^{23}$ may be a group of the formula IV as described above.

With respect to $R^{41}$, if the carbon number of the trivalent hydrocarbon group is 7 or more, the oxygen permeability tends to be low, such being undesirable. Taking into the production efficiency into consideration, the carbon number is preferably from 2 to 4, more preferably 3.

A representative example of $R^{41}$ may be a trivalent hydrocarbon group of the formula VI:

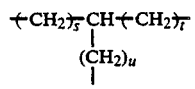

wherein s is an integer of from 0 to 5, t is an integer of from 0 to 5, and u is an integer of from 0 to 5, provided $s+t+u$ is an integer of from 0 to 5.

Symbol a is an integer of from 1 to 1500, and b is an integer of from 0 to 1499. However, if $a+b$ is larger than 1500, the molecular weight of the macromonomer (D) tends to be too large, and the compatibility with other copolymer components tends to be poor, whereby there will be troubles such that it does not adequately dissolve when mixed, white turbidity is likely to form during the polymerization, and it tends to be difficult to obtain a uniform and transparent material. On the other hand, if $a+b$ is 0, not only the oxygen permeability of the resulting material tends to be low, but also the flexibility tends to be low. Therefore, $a+b$ is usually an integer of from 1 to 1500, preferably from 2 to 500, more preferably from 5 to 100.

The macromonomer (D) is incorporated in an amount of from 3 to 40 parts by weight, preferably from 5 to 30 parts by weight, more preferably from 10 to 20 parts by weight, relative to 100 parts by weight of the total amount of the essential copolymer components. If the amount is less than the above lower limit, no adequate effects of using the macromonomer (D) will be obtained, and it tends to be difficult to impart elastic resiliency (toughness or strong elasticity) to the resulting material, and the material tends to be brittle. Yet, in such a case, it becomes difficult to impart adequate mechanical strength. On the other hand, if the amount exceeds the above-mentioned upper limit, the amounts of other essential copolymer components decrease correspondingly, whereby not only the flexibility of the resulting material tends to be poor, but also the compatibility with other copolymer components tends to be poor, and it becomes difficult to obtain a uniform and transparent material.

It is preferred to employ a cross-linking agent to further improve the dimensional stability and durability such as chemical resistance, heat resistance and solvent resistance, of the material of the present invention and to minimize eluting substances. Otherwise, a macromonomer having at least two polymerizable groups in its molecule, may be used as a cross-linking agent.

Specific examples of such cross-linking agent include, for example, ethylene glycol di(meth)acrylate, diethylene glycol di(meth)acrylate, triethylene glycol di(meth)acrylate, propylene glycol di(meth)acrylate, dipropylene glycol di(meth)acrylate, allyl (meth)acrylate, vinyl (meth)acrylate, trimethylolpropane tri(meth)acrylate, methacryloyloxyethyl acrylate, divinylbenzene, diallyl phthalate, diallyl adipate, triallyl isocyanurate, α-methylene-N-vinylpyrrolidone, 4-vinylbenzyl (meth)acrylate, 3-vinylbenzyl (meth)acrylate, 2,2-bis(p-(meth)acryloyloxyphenyl)hexafluoropropane, 2,2-bis(m-(meth)acryloyloxyphenyl)hexafluoropropane, 2,2-bis(o-(meth)acryloyloxyphenyl)hexafluoropropane, 2,2-bis(p-(meth)acryloyloxyphenyl)propane, 2,2-bis-(m-(meth)acryloyloxyphenyl)propane, 2,2 bis-(o-(meth)acryloyloxyphenyl)propane, 1,4-bis-(2-(meth)acryloyloxyhexafluoroisopropyl)benzene, 1,3-bis-(2-(meth)acryloyloxyhexafluoroisopropyl)benzene, 1,2- bis-(2-(meth)acryloyloxyhexafluoroisopropyl)benzene, 1,4-bis-(2-(meth)acryloyloxyisopropyl)benzene, 1,3-bis-(2-(meth)acryloyloxyisopropyl) benzene, and 1,2-bis(2-(meth)acryloyloxyisopropyl)benzene. These cross-linking agents may be used alone or in combination as a mixture of two or more different types.

The above cross-linking agent may be incorporated usually in an amount of from 0.01 to 10 parts by weight, preferably from 0.05 to 8 parts by weight, more preferably from 0.1 to 5 parts by weight, relative to 100 parts by weight of the total amount of the essential copolymer components. If the amount of such a crosslinking agent is less than the above lower limit, no adequate effects of incorporating the cross-linking agent will be obtained. On the other hand, if the amount exceeds the above-mentioned upper limit, the resulting material tends to be brittle.

Further, for the purpose of adjusting the mechanical strength of the resulting material, a reinforcing monomer may further be incorporated to the above-mentioned essential copolymer components. Specific examples of such a reinforcing monomer include, for example, (meth)acrylic acid; styrenes such as styrene, methylstyrene and dimethylaminostyrene; aromatic ring-containing (meth)acrylates such as benzyl (meth)acrylate; and alkylesters such as itaconic acid, crotonic acid, maleic acid and fumaric acid substituted by e.g. an alkyl group. These reinforcing monomers may be used alone or in combination as a mixture of two or more different types.

For the purpose of e.g. imparting a hydrophilic nature, a hydrophilic monomer may further be incorporated to the above-mentioned essential copolymer components. Specific examples of such a hydrophilic monomer include, for example, hydroxyl group-containing (meth)acrylates such as hydroxyethyl (meth)acrylate, hydroxypropyl (meth)acrylate, hydroxybutyl (meth)acrylate, dihydroxypropyl (meth)acrylate, dihydroxybutyl (meth)acrylate, diethylene glycol mono(meth)acrylate, triethylene glycol mono(meth)acrylate and dipropylene glycol mono(meth)acrylate; (meth)acrylic acids; vinyl lactams such as N-vinylpyrrolidone, α-methylene-N-methylpyrrolidone, N-vinylcaprolactam and N-(meth)acryloylpyrrolidone; (meth)acrylamides such as (meth)acrylamide, N-methyl (meth)acrylamide, N-ethyl (meth)acrylamide, N-hydroxyethyl (meth)acrylamide, N,N-dimethyl (meth)acrylamide, N,N-diethyl (meth)acrylamide and N-ethylaminoethyl (meth)acrylamide; aminoalkyl (meth)acrylates such as aminoethyl (meth)acrylate, N-methylaminoethyl (meth)acrylate; and N,N-dimethylaminoethyl (meth)acrylate; and alkoxy group-containing (meth)acrylates such as methoxyethyl (meth)acrylate, ethoxyethyl (meth)acrylate and methoxydiethylene glycol (meth)acrylate. These hydrophilic monomers may be used alone or in combination as a mixture of two or more different kinds.

For the purpose of supplementally improving the oxygen permeability, an oxygen permeability-imparting monomer may further be incorporated to the above-mentioned essential copolymer components. Specific examples of such a monomer include, for example, silicone-containing (meth)acrylates such as pentamethyldisiloxanylmethyl (meth)acrylate, pentamethyldisiloxanylpropyl (meth)acrylate, methylbis(trimethylsiloxy)silylpropyl (meth)acrylate, tris(trimethylsiloxy)silylpropyl (meth)acrylate, mono[methylbis(trimethylsiloxy)siloxy]bis(trimethylsiloxy)silylpropyl (meth)acrylate, tris[methylbis(trimethylsiloxy)siloxy]silylpropyl (meth)acrylate, methylbis(trimethylsiloxy)silylpropylglyceryl (meth)acrylate, tris(trimethylsiloxy)silylpropylglyceryl (meth)acrylate, mono[methylbis(trimethylsiloxy)siloxy]bis(trimethylsiloxy)silylpropylglyceryl (meth)acrylate, trimethylsilylethyltetramethyldisiloxanylpropylglyceryl (meth)acrylate, trimethylsilylmethyl (meth)acrylate, trimethylsilylpropyl (meth)acrylate, trimethylsilylpropylglyceryl (meth)acrylate, pentamethyldisiloxanylpropylglyceryl (meth)acrylate, methylbis(trimethylsiloxy)silylethyltetramethyldisiloxanylmethyl (meth)acrylate, tetramethyltriisopropylcyclotetrasiloxanylpropyl (meth)acrylate and tetramethyltriisopropylcyclotetrasiloxybis(trimethylsiloxy)silylpropyl (meth)acrylate; fluorine or silicon-containing styrenes such as pentafluorostyrene, trimethylstyrene, trifluoromethylstyrene, (pentamethyl-3,3-bis(trimethylsiloxy)trisiloxanyl)styrene and (hexamethyl-3-trimethylsiloxytrisiloxanyl)styrene; and alkyl esters of itaconic acid, crotonic acid, maleic acid, fumaric acid, which may be substituted by a fluorine-containing alkyl group and/or a siloxanyl alkyl group. These monomers may be used alone or in combination as a mixture of two or more different types.

The amounts of the above-mentioned reinforcing monomer, hydrophilic monomer and oxygen-permeability-imparting monomer may optionally suitably adjusted depending upon the particular use of the resulting material. However, the amounts may usually be preferably not more than 30 parts by weight, particularly not more than 20 parts by weight, relative to 100 parts by weight of the total amount of the above-mentioned essential copolymer components. If the amounts of these monomers exceed the above upper limit, the amounts of the above-mentioned essential copolymer components decrease correspondingly, whereby no adequate effects by such copolymer components tend to be obtained.

When the above-mentioned hydrophilic monomer is to be incorporated, the amount of such a hydrophilic monomer is preferably not more than 15 parts by weight relative to 100 parts by weight of the total amount of the above-mentioned essential copolymer components, so that the resulting material may be made substantially non-water absorptive or less water absorptive. For example, when the material of the present invention is used as a contact lens, such a material is preferably substantially non-water absorptive or of an extremely low water absorptivity. If such a material is substantially non-water absorptive, there will be no intrusion or propagation of microorganisms such as bacteria into the lens, whereby cumbersome lens care such as sterilization may not necessarily be periodically required, and the deterioration of the mechanical strength due to an increase of the water content can be minimized. Further, also in a case where the material is used as an intraocular lens, if it is substantially non-water absorptive, a deterioration in the mechanical strength due to an increase of the water absorption can be minimized, and the dimensional stability as the lens will not be impaired.

Further, for the purposes of imparting ultraviolet absorptivity to lenses, coloring the lenses or shutting out a part of light rays in the visible light wave length region, a polymerizable ultraviolet absorber, a polymerizable dyestuff and a polymerizable ultraviolet absorbing dyestuff may be incorporated to the above-mentioned essential copolymer components.

Specific examples of the polymerizable ultraviolet absorber include, for example, benzophenone type polymerizable ultraviolet absorbers such as 2-hydroxy-4-(meth)acryloyloxybenzophenone, 2-hydroxy-4-(meth)acryloyloxy-5-tert-butylbenzophenone, 2-hydroxy-4-(meth)acryloyloxy-2',4'-dichlorobenzophenone and 2-hydroxy-4-(2'-hydroxy-3'-(meth)acryloyloxypropoxy)-benzophenone; benzotriazole type polymerizable ultraviolet absorbers such as 2-(2'-hydroxy-5'-(meth)acryloyloxyethylphenyl)-2H-benzotriazole, 2-(2'-hydroxy-5'(meth)acryloyloxyethylphenyl)-5-chloro-2H-benzotriazole, 2-(2'-hydroxy-5'-(meth)acryloyloxypropylphenyl)-2H-benzotriazole and 2-'-hydroxy-5'-(meth)acryloyloxypropyl-3'-tert-butylphenyl)-5-chloro-2H-benzotriazole; salicylic acid derivative-type polymerizable ultraviolet absorbers such as phenyl 2-hydorxy-4-(meth)acryloyloxymethylbenzoate; and other polymerizable ultraviolet absorbers such as methyl 2-cyano-3-phenyl-3-(3'-(meth)acryloyloxyphenyl)propenoate. These polymerizable ultraviolet absorbers may be used alone or in combination as a mixture of two or more different kinds.

Specific examples of the polymerizable dyestuff include, for example, azo type polymerizable dyestuffs such as 1-phenylazo-4-(meth)acryloyloxynaphthalene, 1-phenylazo-2-hydroxy-3-(meth)acryloyloxynaphthalene, 1-naphthylazo-2-hydroxy-3-(meth)acryloyloxynaphthalene, 1-(α-anthrylazo)-2-hydroxy-3-(meth)acryloyloxynaphthalene, 1-((4'-(phenylazo)phenyl)azo)-2-hydroxy-3-(meth)acryloyloxynaphthalene, 1-(2',4'-xylylazo)-2-(meth)acryloyloxynaphthalene, 1-(o-tolylazo)-2-(meth)acryloyloxynaphthalene, 2-(m-(meth)acryloylamideanilino)-4,6-bis(1'-(o-tolylazo)-2'-naphthylamino)-1,3,5-triazine, 2-(m-vinylanilino)-4-((4'-nitrophenylazo)anilino)-6-chloro-1,3,5-triazine, 2-(1'-(o-tolylazo)-2'-naphthyloxy-4-(m-vinylanilino)-6-chloro-1,3,5-triazine, 2-(p-vinylanilino)-4-(1'-(o-tolylazo)-2'-naphthylamino)-6-chloro-1,3,5-triazine, N-(1'-(o-tolylazo)-2'-naphthyl)-3-vinylphthalic acid monoamide, N-(1'-(o-tolylazo)-2'naphthyl)-6-vinylphthalic acid monoamide, 3-vinylphthalic acid-(4'-(p-sulfophenylazo)-1'-naphthyl)monoester, 6-vinylphthalic acid-(4'-(p-sulfophenylazo)-1'-naphthyl)monoester, 3-(meth)acryloylamide-4-phenylazophenol, 3-(meth)acryloylamide-4-(8'-hydroxy-3',6'-disulfo-1'-naphthylazo)phenol, 3-(meth)acryloylamide-4-(1'-phenylazo-2'-naphthylazo)phenol, 3-(meth)acryloylamide-4-(p-tolylazo)phenol, 2-amino-4-(m-(2'-hydroxy-1'-naphthylazo)anilino)-6-isopropenyl-1,3,5-triazine, 2-amino-4-(N-methyl-p-(2'-hydroxy-1'-naphthylazo)anilino)-6-isopropenyl-1,3,5-triazine, 2-amino-4-(m-(4'-hydroxy-1'-phenylazo)anilino)-6-isopropenyl-1,3,5-triazine, 2-amino-4-(N-methyl-p-(4'-hydroxyphenylazo)anilino)-6-isopropenyl-1,3,5-triazine, 2-amino-4-(m-(3'-methyl-1'-phenyl-5'-hydroxy-4'-pyrazolylazo)anilino)-6-isopropenyl-1,3,5-triazine, 2-amino-4-(N-methyl-p-(3'-methyl-1'-phenyl-5'-hydroxy-4'-pyrazolylazo)anilino)-6-isopropenyl-1,3,5-triazine, 2-amino-4-(p-phenylazoanilino)-6-isopropenyl-1,3,5-triazine and 4-phenylazo-7-(meth)acryloylamide-1-naphthol; anthraquinone type polymerizable dyestuffs such as 1,5-bis((meth)acryloylamino)-9,10-anthraquinone, 1-(4'-vinylbenzoylamide)-9,10-anthraquinone, 4-amino-1-(4'-vinylbenzoylamide)-9,10-anthraquinone, 5-amino-1-(4'-vinylbenzoylamide)-9,10-anthraquinone, 8-amino-1-(4'-vinylbenzoylamide)-9,10-anthraquinone, 4-nitro-1-(4'-vinylbenzoylamide)-9,10-anthraquinone, 4-hydroxy-1-(4'-vinylbenzoylamide)-9,10-anthraquinone, 1-(3'-vinylbenzoylamide)-9,10-anthraquinone, 1-(2'-vinylbenzoylamide)-9,10-anthraquinone, 1-(4'-isopropenylbenzoylamide)-9,10-anthraquinone, 1-(3'-isopropenylbenzoylamide)-9,10-anthraquinone, 1-(2'-isopropenylbenzoylamide)-9,10-anthraquinone, 1,4-bis-(4'-vinylbenzolylamide)-9,10-anthraqunone, 1,4-bis-(4'-isopropenylbenzoylamide)-9,10-anthraquinone, 1,5-bis-(4'-vinylbenzoylamide)-9,10-anthraquinone, 1,5-bis-(4'-isopropenylbenzoylamide)-9,10-anthraquinone, 1-methylamino-4-(3'-vinylbenzoylamide)-9,10-anthraquinone, 1-methylamino-4-(4'-vinylbenzoyloxyethylamino)-9,10-anthraquinone, 1-amino-4-(3'-vinylphenylamino)-9,10-anthraquinone-2-sulfonic acid, 1-amino-4-(4'-vinylphenylamino)-9,10-anthraquinone-2-sulfonic acid, 1-amino-4-(2'-vinylbenzylamino)-9,10-anthraquinone-2-sulfonic acid, 1-amino-4-(3'-(meth)acryloylaminophenylamino)-9,10-anthraquinone-2-sulfonic acid, 1-amino-4-(3'-(meth)acryloylaminobenzylamino)-9,10-anthraquinone-2- sulfonic acid, 1-(β-ethoxycarbonylallylamino)-9,10-anthraquinone, 1-(β-carboxyallylamino)-9,10-anthraquinone, 1,5-di-(β-carboxyallylamino)-9,10anthraquinone, 1-(β-isopropoxycarbonylallylamino)-5-benzoylamide-9,10-anthraquinone, 2-(3'-(meth)acryloylamide-anilino)-4-(3'-(3''-sulfo-4''-aminoanthraquinon-1''-yl)amino-anilino)-6-chloro-1,3,5-triazine, 2-(3'-(meth)acryloylamide-anilino)-4-(3'-(3''-sulfo-4''-aminoanthraquinon-1''-yl)amino-anilino)-6-hydrazino-1,3,5-triazine, 2,4-bis-((4'''-methoxyanthraquinon-1''-yl)amino)-6-(3'-vinylanilino)-1,3,5-triazine and 2-(2'-vinylphenoxy)-4-(4'-(3''-sulfo-4''-aminoanthraquinon-1''-yl-amino)anilino)-6-chloro-1,3,5-triazine; nitro type polymerizable dyestuffs such as o-nitroanilinomethyl (meth)acrylate; and phthalocyanine type polymerizable dyestuffs such as (meth)acryloyl-modified tetramino copper phthalocyanine and (meth)acryloyl-modified (dodecanoyl-modified tetraamino copper phthalocyanine). These polymerizable dyestuffs may be used alone or in combination as a mixture of two or more different kinds.

Specific examples of the polymerizable ultraviolet absorbing dyestuff include, for example, benzophenone type polymerizable ultraviolet absorbing dyestuffs such as 2,4-dihydroxy-3-(p-styrenoazo)benzophenone, 2,4-dihydroxy-5-(p-styrenoazo)benzophenone, 2,4-dihydroxy-3-(p-(meth)acryloyloxymethylphenylazo)benzophenone, 2,4-dihydroxy-5-(p-(meth)acryloyloxymethylphenylazo)benzophenone, 2,4-dihydroxy-3-(p-(meth)acryloyloxyethylphenylazo)benzophenone, 2,4-dihydroxy-5-(p-(meth)acryloyloxyethylphenylazo)benzophenone, 2,4-dihydroxy-3-(p-(meth)acryloyloxypropylphenylazo)benzophenone, 2,4-dihydroxy-5-(p-(meth)acryloyloxypropylphenylazo)benzophenone, 2,4-dihydroxy-3-(o-(meth)acryloyloxymethylphenylazo)benzophenone, 2,4-dihydroxy-5-(o-(meth)acryloyloxymethylphenylazo)benzophenone, 2,4-dihydroxy-3-(o-(meth)acryloyloxyethylphenylazo)benzophenone, 2,4-dihydroxy-5-(o-(meth)acryloyloxyethylphenylazo)benzophenone, 2,4-dihydroxy-3-(o-(meth)acryloyloxypropylphenylazo)benzophenone, 2,4-dihydroxy-5-(o-(meth)acryloyloxypropylphenylazo)benzophenone, 2,4-dihydroxy-3-(p-(N,N-di(meth)acryloyloxyethylamino)phenylazo)benzophenone, 2,4-dihydroxy-5-(p-(N,N-di(meth)acryloyloxyethylamino)phenylazo)benzophenone, 2,4-dihydroxy-3-(o-(N,N-di(meth)acryloyloxyethylamino)phenylazo)-benzophenone, 2,4-dihydroxy-5-(o-(N,N-di(meth)acryloylethylamino)phenylazo)benzophenone, 2,4-dihydroxy-3-(p-(N-ethyl-N-(meth)acryloyloxyethylamino)-phenylazo)benzophenone, 2,4-dihydroxy-5-(p-(N-ethyl-N-(meth)acryloyloxyethylamino)phenylazo)benzophenone, 2,4-dihydroxy-3-(o-(N-ethyl-N-(meth)acryloyloxyethylamino)phenylazo)benzophenone, 2,4-dihydroxy-5-(o-(N-ethyl-N-(meth)acryloyloxyethylamino)phenylazo)benzophenone, 2,4-dihydroxy-3-(p-(N-ethyl-N-(meth)acryloylamino)phenylazo)benzophenone, 2,4-dihydroxy-5-(p-(N-ethyl-N-(meth)acryloylamino)phenylazo)benzophenone, 2,4-dihydroxy-3-(o-(N-ethyl-N-(meth)acryloylamino)-phenylazo)benzophenone and 2,4-dihydroxy-5-(o-(N-ethyl-N-(meth)acryloylamino)phenylazo)benzophenone; and benzoic acid type polymerizable ultraviolet absorbing dyestuffs such as phenyl 2-hydroxy-4-(p-styrenoazo)benzoate. These polymerizable ultraviolet absorbing dyestuffs may be used alone or in combination as a mixture of two or more different kinds.

The amounts of the above-mentioned polymerizable ultraviolet absorber, polymerizable dyestuff and polymerizable ultraviolet absorbing dyestuff are substantially influenced by the thickness of the lens, and they are preferably not more than 3 parts by weight, more preferably from 0.1 to 2 parts by weight, relative to 100 parts by weight of the total amount of the abovementioned essential copolymer components. If the amount exceeds 3 parts by weight, the physical properties of the lens such as strength, tend to deteriorate. Further, in consideration of the toxicity of the ultraviolet absorber or dyestuff, such a material tends to be unsuitable as a material for ocular lenses such as contact lenses which are in direct contact with living tissues or intraocular lenses embedded in living bodies. Further, particularly in the case of a dyestuff, if the amount is too large, the color of the lens tends to be so deep that the transparency decreases, and visible rays tend to be hardly transmitted through the lens.

Further, in the present invention, lens components other than the essential copolymer components, such as a reinforcing monomer, a hydrophilic monomer, an oxygen permeability-imparting monomer, a polymerizable ultraviolet absorber, a polymerizable dyestuff and a polymerizable ultraviolet absorbing dyestuff, may be made into a macromonomer by properly selecting one or more different kinds, and such a macromonomer may be incorporated to the essential copolymer components as one lens component other than the essential monomer components.

The above-mentioned lens components including the essential copolymer components are suitably adjusted depending upon the particular purpose of the desired ocular lens such as a contact lens or an intraocular lens and then subjected to copolymerization.

The ocular lens material of the present invention may be prepared, for example, by a process which comprises mixing the monomer (A), the monomer (B), the macromonomer (C), the macromonomer (D) and optionally added other components, and adding a radical polymerization initiator thereto, followed by polymerization by a usual method.

The usual method may be a method of gradually heating the mixture after the addition of the radical polymerization initiator, at a temperature within a range of from room temperature to about 130° C., or a method of irradiating electromagnetic waves such as microwaves, ultraviolet rays or radiation rays ($\gamma$-rays). In the case of the heat polymerization, the temperature may stepwisely be raised. The polymerization may be conducted by a bulk polymerization method or a solvent polymerization method by means of a solvent, or it may be conducted by any other method.

Specific examples of the radical polymerization initiator include, for example, azobisisobutyronitrile, azobisdimethylvaleronitrile, benzoyl peroxide, tert-butyl hydroperoxide and cumene hydroperoxide. These radical polymerization initiators may be used alone or in combination as a mixture of two or more different kinds. In a case where photopolymerization is employed, a photopolymerization initiator or sensitizer is preferably added. The above-mentioned polymerization initiator or sensitizer is incorporated usually in an amount of from about 0.001 to 2 parts by weight, preferably from 0.01 to 1 part by weight, relative to 100 parts by weight of the total amount of the lens components to be polymerized.

For the shaping of ocular lenses such as contact lenses or intraocular lenses, shaping methods commonly used by those skilled in the art may be employed. As such shaping methods, there may be mentioned, for example, a cutting and grinding method and a molding method. The cutting and grinding method is a method in which the polymerization is conducted in a suitable mold or vessel to obtain a rod-, block- or plate-shaped base material (polymer), and then the base material is processed into a desired shape by mechanical processing such as cutting, grinding and polishing. The molding method is a method wherein a mold corresponding to the shape of a desired ocular lens is prepared, and the polymerization of the above-mentioned lens components is conducted in this mold to obtain a molded product, which may further be subjected to mechanical finishing treatment, if necessary.

The ocular lens material of the present invention is a soft material at a temperature around room temperature. Therefore, a molding method is generally suitable as the shaping method. As the molding method, a spin casting method or a static casting method is known.

To obtain an intraocular lens, a supporting portion of the lens may be prepared separately from the lens and then attached to the lens, or it may be molded simultaneously (integrally) with the lens.

In the present invention, plasma treatment may be applied to the ocular lens material, if necessary. The apparatus and method for the treatment may be those commonly employed in the conventional technique. Such treatment is conducted by irradiating a plasma in an inert gas atmosphere such as helium, neon or argon or in a gas atmosphere such as air, oxygen, nitrogen, carbon monoxide or carbon dioxide, under a pressure of from about 0.0001 Torr to a few Torr at an output of from about a few W to 100W for from few seconds to a few tens minutes. The treatment is preferably conducted by irradiating a plasma in an atmosphere of air, oxygen or argon under a pressure of from about 0.05 Torr to 3 Torr at an output of form about 10W to 60W for a few minutes.

Further, a hydrophilic nature may be imparted to the surface of the soft ocular lens material by applying alkali treatment to the material. By such hydrophilic treatment of the surface, the tackiness of the surface of the material may further be reduced.

The alkali to be used for such alkali treatment includes, for example, sodium hydroxide, potassium hydroxide and ammonium hydroxide. Such an alkali is used for the treatment in the form of an aqueous solution. The conditions for such alkali treatment are suitably selected taking the strength of the alkali into consideration within such ranges that the alkali concentration in the aqueous solution is from about 0.3 to 50% by weight, the treating temperature is from about 20° to 100° C., and the treating time is from about 0.5 to 200 hours.

If the alkali concentration is lower, or the treating time is shorter than the above range, it takes time to form a certain predetermined hydrophilic layer on the surface of the material, such being not practical and undesirable. If the alkali concentration is higher, or the treating temperature is higher than the above range, the hydrophilic layer tends to be formed deep in the material in a short period of time, whereby the water absorptivity will increase, and there will be a difference in the stress as between the hydrophilic layer swelled by water and the interior of the material remaining in the untreated state, thus leading to a deformation, such being undesirable.

If the treating time is shorter than the above range, it becomes difficult to obtain a hydrophilic layer having a constant thickness, and the hydrophilic layer will be so thin that the durability of hydrophilicity will be low. On the other hand, if the treating time is longer than the above range, such an operation is not practical as being time consuming.

The ocular lens material of the present invention thus obtained, is (a) soft, whereby when made into a contact lens, it provides a comfortable feeling to the wearer, and when made into an intraocular lens, it will not damage the ocular tissues and can readily be inserted in a deformed shape through a small incision, and (b) substantially non-water absorptive or of a low water absorptivity, whereby it is free from a deterioration of the mechanical strength due to an increase of the water absorptivity and free from a deterioration of the dimensional stability as a lens, and bacteria will hardly propagate in the material, whereby when made into contact lenses, cumbersome treatment such as boiling for sterilization, may be omitted, and (c) excellent in the oxygen permeability, whereby when made into a contact lens, it does not impair the metabolic function of the cornea, and (d) excellent in the mechanical strength, whereby the dimension as a lens is stable, and it is unbreakable against various physical treatments, and (e) hardly stained with e.g. lipid stains, whereby it is free from turbidity of lenses due to such stains and it is free from adversely affecting the ocular tissues, and (f) free from surface tackiness, whereby a trouble such as adhesion to the ocular tissues will scarcely occur.

Now, the soft ocular lens material of the present invention will be described in further detail with reference to Reference Examples and Working Examples of the present invention. However, it should be understood that the present invention is by no means restricted by such specific Examples.

REFERENCE EXAMPLE 1

Preparation of macromonomer (C)

Into a 300 ml Erlenmeyer flask, 0.0625 mol (20.63 g) of 1,3-bis(methacryloyloxymethyl)-1,1,3,3-tetramethyldisiloxane, 0.5 mol (148 g) of octamethylcyclotetrasiloxane and 5 g of concentrated sulfuric acid were charged, and after putting a stopper on the flask, the mixture was stirred at room temperature (at about 24° C.) for 24 hours. The reaction solution was put into a 1 l Erlenmeyer flask containing 600 ml of n-hexane and thoroughly mixed. The mixture was washed twice with 300 ml of a 10% sodium carbonate aqueous solution. Further, it was washed with 300 ml of water and dried over anhydrous magnesium sulfate, and the solvent was completely removed. The resulting viscous solution was filtered under suction to obtain a reaction product. The amount was 153.45 g, and the yield was 91.0%. The infrared absorption spectrum and proton nuclear magnetic resonance spectrum of this reaction product were measured and analyzed, whereby this reaction product was ascertained to be a compound (one type of macromonomer (C)) represented by the following formula:

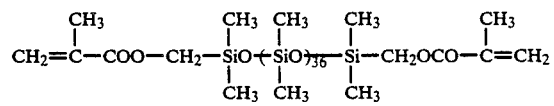

REFERENCE EXAMPLE 2

Preparation of macromonomer (C)

Into a 300 ml Erlenmeyer flask, 12.7 g of 1,3-bis(methacryloyloxymethyl)-1,1,3,3-tetramethyldicyclohexane, 148 g of octamethylcyclotetrasiloxane and 5 g of concentrated sulfuric acid were charged, and after putting a stopper on the flask, the mixture was stirred at room temperature (at about 24° C.) for 24 hours. The reaction solution was put into a 1 l Erlenmeyer flask containing 600 ml of n-hexane and thoroughly mixed. The mixture was washed twice with 300 ml of a 10% sodium carbonate aqueous solution. Further, it was washed with 300 ml of water and dried over anhydrous magnesium sulfate, and the solvent was completely removed. The resulting viscous liquid was filtered under suction to obtain a reaction product. The infrared absorption spectrum and proton nuclear magnetic resonance spectrum of this product were measured and analyzed, whereby the product was ascertained to be a compound (one type of macromonomer (C)) represented by the following formula:

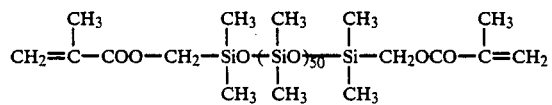

REFERENCE EXAMPLE 3

Preparation of macromonomer (C) Into a 300 ml Erlenmeyer flask, 6.6 g of bis-1,3-(methacryloyloxymethyl)-1,1,3,3-tetramethyl-disiloxane, 48 g of octamethylcyclotetrasiloxane and 5 g of concentrated sulfuric acid were charged, and after putting a stopper on the flask, the mixture was stirred at room temperature (at about 24° C.) for 24 hours. The reaction solution was put into a 1 l Erlenmeyer flask containing 600 ml of n-hexane and thoroughly mixed. The mixture was washed twice with 300 ml of a 10% sodium carbonate aqueous solution. Further, it was washed with 300 ml of water and dried over anhydrous magnesium sulfate, and the solvent was completely removed. The resulting viscous liquid was filtered under suction to obtain a reaction product. The infrared absorption spectrum and proton nuclear magnetic resonance spectrum of this reaction product were measured and analyzed, whereby the product was ascertained to be a compound (one type of macromonomer (C)) represented by the following formula:

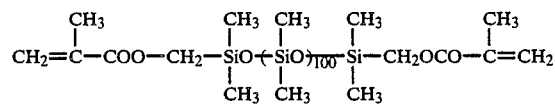

REFERENCE EXAMPLE 4

Preparation of macromonomer (D)

Into a 200 ml Erlenmeyer round bottom flask equipped with a Dimroth condenser, 53.0 g of a polydimethylsiloxane (molecular weight: about 1000, hydroxyl group-content: 0.106 equivalent) of the formula:

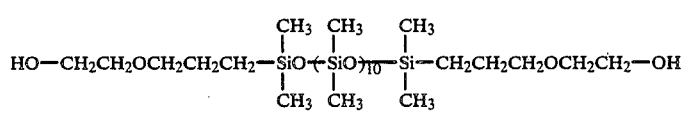

having a hydroxyl group at each terminal, and 25 ml (0.106 mol) of isophorone diisocyanate were charged and stirred at room temperature (at about 24° C.) for 5 hours. Then, 13.0 g (0.112 mol) of 2-hydroxyethyl acrylate was added, and the mixture was stirred. Then, one drop of dibutyltin dilaurate was added, and the mixture was further stirred to obtain a highly viscous crude product. This product was dissolved in methylene chloride and then washed with a large amount of water. After removal of water, the solvent was distilled off to obtain a reaction product. The infrared absorption spectrum and proton nuclear magnetic resonance spectrum of this reaction product were measured and analyzed, whereby the product was ascertained to be a compound (one type of macromonomer (D)) represented by the following formula:

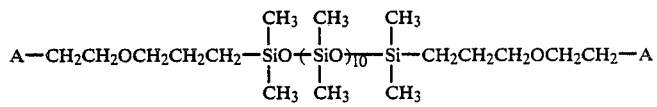

wherein A represents:

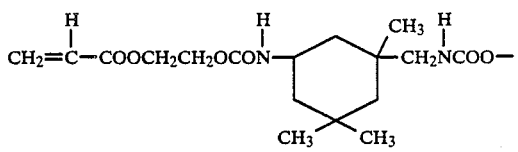

REFERENCE EXAMPLE 5

Preparation of macromonomer (D)

A reaction product was prepared by the same operation as in Reference Example 4 except that instead of the polydimethylsiloxane used in Reference Example 4, a polydimethylsiloxane represented by the formula:

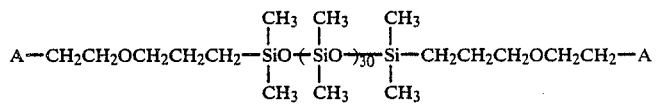

was used. The infrared absorption spectrum and proton nuclear magnetic resonance spectrum of this reaction product were measured and analyzed, whereby the product was ascertained to be a compound (one type of macromonomer (D)) represented by the following formula:

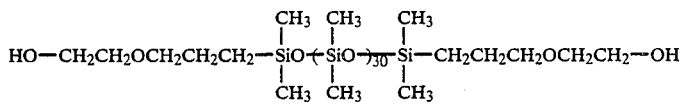

wherein A represents:

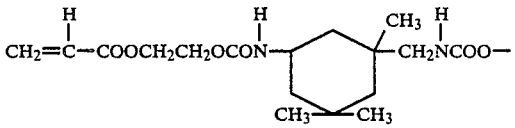

REFERENCE EXAMPLE 6

Preparation of macromonomer (D)

A reaction product was prepared in the same manner as in Reference Example 4 except that instead of the polydimethylsiloxane used in Reference Example 4, a polydimethylsiloxane represented by the formula:

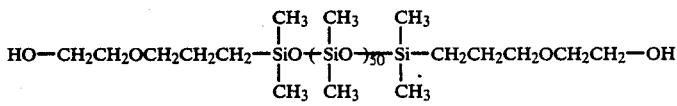

was used. The infrared absorption spectrum and proton nuclear magnetic resonance spectrum of this reaction product were measured and analyzed, whereby the product was ascertained to be a compound (one type of macromonomer (D)) represented by the following formula:

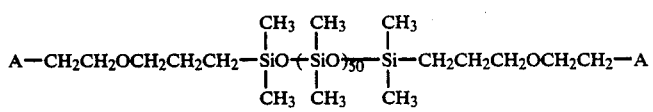

wherein A represents:

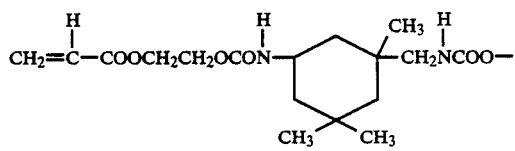

EXAMPLE 1

Preparation of ocular lens material

A gasket made of a fluorine resin was sandwiched by polyester films from both sides and further sandwiched by glass plates placed thereover to obtain a mold.

20 parts by weight of 2,2,2,2',2',2'-hexafluoroisopropyl acrylate, 50 parts by weight of butyl acrylate, 10 parts by weight of the macromonomer (C) obtained in Reference Example 1, 20 parts by weight of the macromonomer (D) obtained in Reference Example 4 and 0.5 part by weight of ethylene glycol dimethacrylate, were uniformly blended, and 0.3 part by weight of azobisdimethylvaleronitrile was added thereto to obtain a blend solution. The blend solution was injected to the above mold.

The mold was transferred to an air circulating dryer, and the blend solution was polymerized at 50° C. for 12 hours and then the temperature was raised at a rate of 10° C. per 2 hours, to obtain a copolymer of a film form.

The surface of the copolymer thus obtained, was touched with a finger tip, whereby substantially no tackiness was felt, and the surface condition was excellent. Further, such a copolymer was folded back and then released, whereupon it immediately returned to the initial state, thus indicating excellent resiliency. Thus, this copolymer was ascertained to have flexibility suitable as a soft ocular lens material. Further, a test specimen in water was visually observed, whereby the outer appearance was transparent and faultless.

Then, test specimens having a diameter of 14 mm were punched out of the copolymer film, and various physical properties were measured with respect to the test specimens. The physical properties were measured by the following methods, and the results are shown in Table 1.

Strength against penetration (a) Penetration resistance

By means of an Instron type compression tester, a pressing needle having a diameter of 1/16 inch was pressed against the center of a test specimen, and the load (g) at the time of the breakage of the test specimen, was measured. However, the values listed in the Table are values calculated as the thickness of the test specimen was 0.2 mm.

(b) Elongation

The elongation (%) at the time of the breakage of the test specimen in the above-mentioned measurement of the penetration resistance (g), was measured.

(c) Strength index

The strength of the material depends on both the elongation (%) and the penetration resistance (g). Therefore, as an index for relative strength, the strength index was calculated in accordance with the following equation.

$$\text{Strength index} = \frac{\text{Penetration reistance (g)} \times \text{Elongation (\%)}}{2 \times \text{Thickness of the specimen} \times (\mu m)}$$

Average thickness

The average thickness (mm) of a test specimen at the time of measuring the oxygen permeation coefficient by the following method, was measured.

Oxygen permeation coefficient

The oxygen permeation coefficient of a test specimen was measured in a physiological sodium chloride aqueous solution at 35° C. by means of a Seikaken type film oxygen permeation measuring instrument manufactured by Rika Seiki Kogyo Kabushiki Kaisha. The unit for the oxygen permeation coefficient is $$\frac{ml\ (STP) \cdot cm^2}{cm^3 \cdot sec \cdot mmHg}.$$

The oxygen permeation coefficients in the Table are numerical values obtained by multiplying the values of the oxygen permeation coefficients by $10^{11}$.

Oleic acid swelling coefficient

Oleic acid is one component of ocular lipids. Swelling of the material in oleic acid indicates the affinity to oleic acid. Accordingly, by meaning the swelling coefficient of the material in oleic acid, it is possible to determine whether lipids are likely to adhere to the material.

The oleic acid swelling coefficient is a value (no unit) obtained by dividing the size of a test specimen in oleic acid at 35° C. by the size in a physiolosical sodium chloride aqueous solution.

Contact angle

The contact angle of a test specimen to water was measured by a bubble method at room temperature (at about 20° C.) under a humidity of 50% by means of a goniometer type contact angle tester (Elmer Kogaku K.K.).

Water absorptivity

After extracting remaining monomers from a test specimen by reflux extraction by means of hexane, the water absorptivity of the test specimen was measured in accordance with the following equation:

$$\text{Water absorptivity (\%)} = \frac{W - W_o}{W_o} \times 100$$

where W is the weight (g) of the test specimen upon absorption of water to the equilibrium state, and Wo is the weight (g) of the test specimen in a dried state.

EXAMPLES 2 to 47

In the same manner as in Example 1, various components were mixed to bring the composition as shown in Table 1 and polymerized to obtain a copolymer of a film form, which was processed to obtain test specimens. Then, with respect to the test specimens, various physical properties were measured in the same manner as in Example 1. The results are also shown in Table 1.

In Table 1, various abbreviations have the following meanings:

6FA: 2,2,2,2',2',2'-Hexafluoroisopropyl acrylate
BuA: Butyl acrylate
EDMA: Ethylene glycol dimethacrylate
AA: Acrylic acid
V-65: Azobisdimethylvaleronitrile The proportions of the blend components in Table 1 are all represented by parts by weight.

TABLE 1

| Comparative Example Nos. | Blend components | | | | | | Physical properties | | | | | | |
|---|---|---|---|---|---|---|---|---|---|---|---|---|---|
| | Monomer (A) | Monomer (B) | Macromonomer (C) | Macromonomer (D) | Cross-linking agent | Other copolymer components | Polymerization initiator | Penetration strength | | Average thickness (mm) | Oxygen permeation coefficient | Oleic acid swelling coefficient (—) | Contact angle (°) | Water absorptivity (%) |
| | | | | | | | | Penetration resistance (g) | Elongation (%) / Strength index (g·%/μm) | | | | | |

| No. | Monomer (A) | Monomer (B) | Macromonomer (C) | Macromonomer (D) | Cross-linking agent | Other copolymer components | Polymerization initiator | Penetration resistance (g) | Elongation (%) | Strength index (g·%/μm) | Average thickness (mm) | Oxygen permeation coefficient | Oleic acid swelling coefficient (—) | Contact angle (°) | Water absorptivity (%) |
|---|---|---|---|---|---|---|---|---|---|---|---|---|---|---|---|
| 1 | 6FA 20 | BuA 50 | Ref. Ex. 1 10 | Ref. Ex. 4 20 | EDMA 0.5 | — | V-65 0.3 | 192.3 | 49.2 | 25 | 0.285 | 85.2 | 1.18 | 65 | 0.73 |
| 2 | 6FA 40 | BuA 30 | Ref. Ex. 1 10 | Ref. Ex. 4 20 | EDMA 0.5 | — | V-65 0.3 | 182.0 | 48.5 | 22 | 0.295 | 93.0 | 1.07 | 70 | 0.49 |
| 3 | 6FA 50 | BuA 20 | Ref. Ex. 1 10 | Ref. Ex. 4 20 | EDMA 0.5 | — | V-65 0.3 | 503.8 | 106.9 | 135 | 0.290 | 98.2 | 1.07 | 72 | 0.65 |
| 4 | 6FA 40 | BuA 35 | Ref. Ex. 1 10 | Ref. Ex. 4 15 | EDMA 0.5 | — | V-65 0.3 | 262.4 | 84.7 | 56 | 0.277 | 98.5 | 1.11 | 62 | 0.46 |
| 5 | 6FA 40 | BuA 25 | Ref. Ex. 1 20 | Ref. Ex. 4 15 | EDMA 0.5 | — | V-65 0.3 | 258.0 | 63.1 | 41 | 0.246 | 99.1 | 1.09 | 62 | 0.48 |
| 6 | 6FA 50 | BuA 25 | Ref. Ex. 1 10 | Ref. Ex. 4 15 | EDMA 0.5 | — | V-65 0.3 | 337.9 | 103.8 | 92 | 0.253 | 99.1 | 1.07 | 64 | 0.38 |
| 7 | 6FA 50 | BuA 15 | Ref. Ex. 1 20 | Ref. Ex. 4 15 | EDMA 0.5 | — | V-65 0.3 | 306.1 | 88.2 | 68 | 0.247 | 100.5 | 1.05 | 70 | 0.35 |
| 8 | 6FA 40 | BuA 25 | Ref. Ex. 1 10 | Ref. Ex. 4 25 | EDMA 0.5 | — | V-65 0.3 | 208.7 | 40.0 | 21 | 0.277 | 97.4 | 1.09 | 68 | 0.37 |
| 9 | 6FA 30 | BuA 35 | Ref. Ex. 1 10 | Ref. Ex. 4 25 | EDMA 0.5 | — | V-65 0.3 | 212.9 | 40.9 | 21 | 0.280 | 95.1 | 1.10 | 64 | 0.40 |
| 10 | 6FA 25 | BuA 35 | Ref. Ex. 1 15 | Ref. Ex. 4 25 | EDMA 0.5 | — | V-65 0.3 | 218.2 | 42.4 | 23 | 0.270 | 94.3 | 1.10 | 65 | 0.33 |
| 11 | 6FA 45 | BuA 30 | Ref. Ex. 1 10 | Ref. Ex. 4 15 | EDMA 0.5 | — | V-65 0.3 | 275.3 | 79.0 | 54 | 0.242 | 102.1 | 1.06 | 68 | 0.41 |
| 12 | 6FA 45 | BuA 25 | Ref. Ex. 1 15 | Ref. Ex. 4 15 | EDMA 0.5 | — | V-65 0.3 | 240.6 | 61.4 | 37 | 0.248 | 99.2 | 1.05 | 70 | 0.39 |
| 13 | 6FA 20 | BuA 40 | Ref. Ex. 1 20 | Ref. Ex. 4 20 | EDMA 0.5 | AA 4 | V-65 0.3 | 197.7 | 44.7 | 22 | 0.260 | 88.1 | 1.16 | 36 | 1.33 |
| 14 | 6FA 45 | BuA 20 | Ref. Ex. 1 20 | Ref. Ex. 4 15 | EDMA 0.5 | — | V-65 0.3 | 275.6 | 58.7 | 42 | 0.263 | 105.3 | 1.05 | 69 | 0.37 |
| 15 | 6FA 40 | BuA 30 | Ref. Ex. 1 15 | Ref. Ex. 4 15 | EDMA 0.5 | — | V-65 0.3 | 236.9 | 56.3 | 34 | 0.244 | 97.6 | 1.04 | 67 | 0.48 |
| 16 | 6FA 50 | BuA 20 | Ref. Ex. 1 15 | Ref. Ex. 4 15 | EDMA 0.5 | — | V-65 0.3 | 244.5 | 51.6 | 33 | 0.250 | 101.2 | 1.05 | 66 | 0.40 |
| 17 | 6FA 55 | BuA 20 | Ref. Ex. 1 10 | Ref. Ex. 4 15 | EDMA 0.5 | — | V-65 0.3 | 205.0 | 49.8 | 28 | 0.274 | 99.5 | 1.03 | 68 | 0.34 |
| 18 | 6FA 55 | BuA 15 | Ref. Ex. 1 15 | Ref. Ex. 4 15 | EDMA 0.5 | — | V-65 0.3 | 306.4 | 63.5 | 50 | 0.237 | 103.4 | 1.02 | 71 | 0.38 |
| 19 | 6FA 40 | BuA 25 | Ref. Ex. 1 10 | Ref. Ex. 4 25 | EDMA 0.5 | — | V-65 0.3 | 208.7 | 40.0 | 21 | 0.277 | 97.4 | 1.09 | 68 | 0.37 |
| 20 | 6FA 30 | BuA 35 | Ref. Ex. 1 10 | Ref. Ex. 4 25 | EDMA 0.5 | — | V-65 0.3 | 212.9 | 40.2 | 21 | 0.280 | 95.1 | 1.10 | 64 | 0.40 |
| 21 | 6FA 25 | BuA 35 | Ref. Ex. 1 15 | Ref. Ex. 4 25 | EDMA 0.5 | — | V-65 0.3 | 218.2 | 42.4 | 23 | 0.270 | 94.3 | 1.10 | 65 | 0.38 |
| 22 | 6FA 25 | BuA 40 | Ref. Ex. 1 10 | Ref. Ex. 4 25 | EDMA 0.5 | — | V-65 0.3 | 191.3 | 40.7 | 20 | 0.250 | 92.1 | 1.15 | 63 | 0.39 |
| 23 | 6FA 25 | BuA 40 | Ref. Ex. 1 10 | Ref. Ex. 4 25 | EDMA 0.5 | — | V-65 0.3 | 222.9 | 47.3 | 27 | 0.274 | 95.4 | 1.12 | 63 | 0.35 |

TABLE 1-continued

| Comparative Example Nos. | Blend components | | | | | | | Physical properties | | | | | | |
|---|---|---|---|---|---|---|---|---|---|---|---|---|---|---|
| | Monomer (A) | Monomer (B) | Macromonomer (C) | Macromonomer (D) | Crosslinking agent | Other copolymer components | Polymerization initiator | Penetration strength | | Average thickness (mm) | Oxygen permeation coefficient | Oleic acid swelling coefficient (—) | Contact angle (°) | Water absorptivity (%) |
| | | | | | | | | Penetration resistance (g) | Elongation (%) | Strength index (g·%/μm) | | | | |
| 24 | 6FA 35 | BuA 30 | Ref. Ex. 2 10 | Ref. Ex. 4 25 | EDMA 0.5 | — | V-65 0.3 | 194.4 | 51.2 | 25 | 0.228 | 111.8 | 1.05 | 70 | 0.75 |
| 25 | 6FA 45 | BuA 25 | Ref. Ex. 2 15 | Ref. Ex. 4 15 | EDMA 0.5 | — | V-65 0.3 | 177.4 | 50.7 | 22 | 0.265 | 120.0 | 1.03 | 71 | 1.05 |
| 26 | 6FA 50 | BuA 25 | Ref. Ex. 2 10 | Ref. Ex. 4 15 | EDMA 0.5 | — | V-65 0.3 | 183.9 | 53.0 | 24 | 0.242 | 94.4 | 1.07 | 64 | 1.04 |
| 27 | 6FA 40 | BuA 35 | Ref. Ex. 2 10 | Ref. Ex. 4 15 | EDMA 0.5 | — | V-65 0.3 | 220.3 | 52.6 | 29 | 0.236 | 107.2 | 1.05 | 65 | 1.03 |
| 28 | 6FA 40 | BuA 30 | Ref. Ex. 3 15 | Ref. Ex. 4 15 | EDMA 0.5 | — | V-65 0.3 | 288.4 | 107.5 | 78 | 0.240 | 93.9 | 1.07 | 68 | 0.54 |
| 29 | 6FA 40 | BuA 40 | Ref. Ex. 3 5 | Ref. Ex. 4 15 | EDMA 0.5 | — | V-65 0.3 | 222.5 | 81.2 | 46 | 0.271 | 111.7 | 1.06 | 70 | 0.48 |
| 30 | 6FA 40 | BuA 35 | Ref. Ex. 1 10 | Ref. Ex. 5 15 | EDMA 0.5 | — | V-65 0.5 | 193.7 | 94.0 | 46 | 0.277 | 85.7 | 1.05 | 67 | 0.35 |
| 31 | 6FA 45 | BuA 40 | Ref. Ex. 1 10 | Ref. Ex. 5 10 | EDMA 0.5 | — | V-65 0.3 | 216.2 | 92.9 | 50 | 0.273 | 93.0 | 1.04 | 67 | 0.22 |
| 32 | 6FA 45 | BuA 35 | Ref. Ex. 1 10 | Ref. Ex. 5 10 | EDMA 0.5 | — | V-65 0.3 | 467.8 | 170.3 | 202 | 0.286 | 95.2 | 1.03 | 70 | 0.30 |
| 33 | 6FA 50 | BuA 30 | Ref. Ex. 1 10 | Ref. Ex. 5 10 | EDMA 0.5 | — | V-65 0.3 | 178.0 | 98.8 | 44 | 0.228 | 84.3 | 1.04 | 65 | 0.33 |
| 34 | 6FA 40 | BuA 35 | Ref. Ex. 1 10 | Ref. Ex. 5 15 | EDMA 0.5 | — | V-65 0.3 | 220.7 | 102.2 | 56 | 0.276 | 94.8 | 1.04 | 64 | 0.40 |
| 35 | 6FA 45 | BuA 30 | Ref. Ex. 1 10 | Ref. Ex. 5 15 | EDMA 0.5 | — | V-65 0.3 | 455.2 | 153.9 | 175 | 0.254 | 109.8 | 1.03 | 68 | 0.21 |
| 36 | 6FA 50 | BuA 25 | Ref. Ex. 1 10 | Ref. Ex. 5 15 | EDMA 0.5 | — | V-65 0.3 | 165.4 | 64.8 | 27 | 0.253 | 92.2 | 1.03 | 64 | 0.38 |
| 37 | 6FA 45 | BuA 30 | Ref. Ex. 1 10 | Ref. Ex. 5 20 | EDMA 0.5 | — | V-65 0.3 | 250.9 | 92.0 | 60 | 0.272 | 100.0 | 1.02 | 64 | 0.35 |
| 38 | 6FA 45 | BuA 25 | Ref. Ex. 1 10 | Ref. Ex. 5 20 | EDMA 0.5 | — | V-65 0.3 | 491.3 | 146.9 | 180 | 0.270 | 99.8 | 1.02 | 67 | 0.38 |
| 39 | 6FA 50 | BuA 20 | Ref. Ex. 1 10 | Ref. Ex. 5 20 | EDMA 0.5 | — | V-65 0.3 | 195.2 | 106.7 | 53 | 0.258 | 89.3 | 1.04 | 67 | 0.35 |
| 40 | 6FA 40 | BuA 40 | Ref. Ex. 1 10 | Ref. Ex. 6 10 | EDMA 0.5 | — | V-65 0.3 | 193.8 | 112.2 | 57 | 0.280 | 104.2 | 1.04 | 68 | 0.40 |
| 41 | 6FA 45 | BuA 35 | Ref. Ex. 1 10 | Ref. Ex. 6 10 | EDMA 0.5 | — | V-65 0.3 | 203.6 | 102.1 | 53 | 0.233 | 107.7 | 1.03 | 68 | 0.33 |
| 42 | 6FA 50 | BuA 30 | Ref. Ex. 1 10 | Ref. Ex. 6 10 | EDMA 0.5 | — | V-65 0.3 | 223.2 | 107.2 | 60 | 0.238 | 95.3 | 1.03 | 66 | 0.36 |
| 43 | 6FA 40 | BuA 35 | Ref. Ex. 1 10 | Ref. Ex. 6 15 | EDMA 0.5 | — | V-65 0.3 | 261.9 | 112.2 | 76 | 0.247 | 116.1 | 1.03 | 69 | 0.32 |
| 44 | 6FA 45 | BuA 25 | Ref. Ex. 1 10 | Ref. Ex. 6 15 | EDMA 0.5 | — | V-65 0.3 | 381.7 | 153.7 | 151 | 0.255 | 120.1 | 1.02 | 67 | 0.21 |
| 45 | 6FA 40 | BuA 30 | Ref. Ex. 1 10 | Ref. Ex. 6 20 | EDMA 0.5 | — | V-65 0.3 | 233.7 | 109.4 | 65 | 0.275 | 106.0 | 1.03 | 68 | 0.28 |

TABLE 1-continued

| Comparative Example Nos. | Blend components ||||||| Physical properties |||||||
|---|---|---|---|---|---|---|---|---|---|---|---|---|---|
| | | | | | Other copolymer components | Polymerization initiator | Penetration strength ||| Average thickness (mm) | Oxygen permeation coefficient | Oleic acid swelling coefficient (—) | Contact angle (°) | Water absorptivity (%) |
| | Monomer (A) | Monomer (B) | Macromonomer (C) | Macromonomer (D) | Crosslinking agent | | | Penetration resistance (g) | Elongation (%) | Strength index (g·%/μm) | | | | |
| 46 | 6FA 45 | BuA 25 | Ref. Ex. 1 10 | Ref. Ex. 6 20 | EDMA 0.5 | — | V-65 0.3 | 232.9 | 97.7 | 59 | 0.275 | 116.8 | 1.03 | 67 | 0.22 |
| 47 | 6FA 50 | BuA 20 | Ref. Ex. 1 10 | Ref. Ex. 6 20 | EDMA 0.5 | — | V-65 0.3 | 515.9 | 144.7 | 186 | 0.280 | 120.1 | 1.02 | 68 | 0.35 |

The test specimens obtained in Examples 2 to 47 all exhibited no substantial tackiness when their surface was touched by a finger tip, and the surface conditions were all excellent. Further, when the test specimens were folded back and released, they immediately returned to the initial state, thus indicating excellent resiliency, and they had flexibility suitable as a soft ocular lens material. Further, the test specimens immersed in water were visually observed, whereby their outer appearance was transparent and faultless.

REFERENCE EXAMPLE 7

Preparation of macromonomer (D)

Into a 200 ml four-necked flask, 20 g (0.02 mol) of a polydimethylsiloxane having a hydroxyl group at each terminal, of the formula:

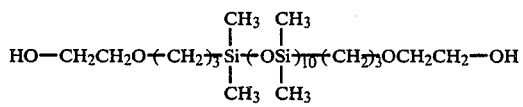

and 5 g of cyclohexane and 0.01 g of dibutyltin dilaurate were charged. To this four-necked flask, a thermometer, a condenser and a 100 ml dropping funnel were attached, and the mixture was stirred by means of a stirring seal. In the dropping funnel, 6.2 g (0.04 mol) of 2-isocyanate ethyl methacrylate and 5 g of cyclohexane were introduced. The mixture in the four-necked flask was heated to 80° C., and 2-isocyanate ethyl methacrylate and cyclohexane in the dropping funnel, were dropwise added over a period of 30 minutes while maintaining the temperature at a level of from 80° to 85° C. Then, the mixture was stirred at 80° C. for 1 hour. After completion of the reaction, the four-necked flask was cooled, and 300 ml of n-hexane was added. This mixture was transferred to a 1000 ml separating funnel, and by an addition of 200 ml of a 20% sodium chloride aqueous solution, the n-hexane layer was washed. This washing was repeated four times. Then, n-hexane layer was transferred to a 500 ml Erlenmeyer flask, and after an addition of anhydrous magnesium sulfate, left to stand overnight and dried. Then, it was filtered and transferred to a 500 ml egg plant type flask. Then, n-hexane was removed by means of an evaporator. The remaining product was transferred to a 100 ml egg plant type flask. Low boiling point substances were removed under suction at 50° C. under 0.12 mmHg for 20 minutes by means of a capillary, and the remaining product was filtered under suction to obtain an reaction product. The infrared absorption spectrum and proton nuclear magnetic resonance spectrum of this reaction product were measured and analyzed, whereby the product was ascertained to be a polysiloxane macromonomer (one type of macromonomer (D)) having a polymerizable group of the formula:

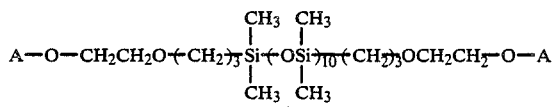

wherein A is

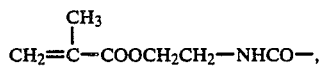

bonded to the siloxane main chain via one urethane bond.

REFERENCE EXAMPLE 8

Preparation of macromonomer (D))

A reaction product was prepared in the same manner as in Reference Example 7 except that instead of the polydimethylsiloxane used in Reference Example 7, a polydimethylsiloxane having a hydroxyl group at each terminal, of the formula:

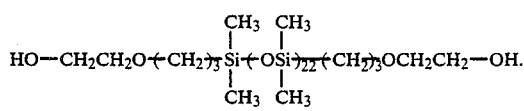

The infrared absorption spectrum and proton nuclear magnetic resonance spectrum of the reaction product were measured and analyzed, whereby the reaction product was ascertained to be a polysiloxane macromonomer (one type of macromonomer (D)) having a polymerizable group of the formula:

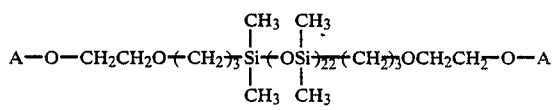

wherein A is

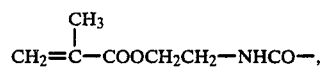

bonded to the siloxane main chain via one urethane bond.

REFERENCE EXAMPLE 9

Preparation of macromonomer (D))

A reaction product was prepared in the same manner as in Reference Example 7 except that instead of the polydimethylsiloxane used in Reference Example 7, a polydimethylsiloxane having a hydroxyl group at each terminal, of the formula:

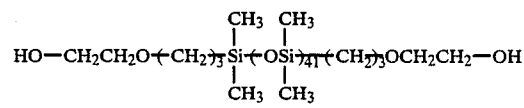

was used. The infrared absorption spectrum and proton nuclear magnetic resonance spectrum of this reaction product were measured and analyzed, whereby the product was ascertained to be a polysiloxane macromonomer (one type of macromonomer (D)) having a polymerizable group of the formula:

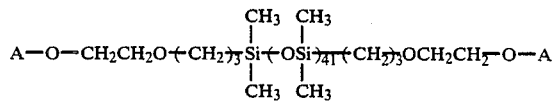

wherein A is

bonded to the siloxane main chain via one urethane bond.

REFERENCE EXAMPLE 10

Preparation of macromonomer (D))

A reaction product was prepared in the same manner as in Reference Example 7 except that instead of the polydimethylsiloxane used in Reference Example 7, a polydimethylsiloxane having a hydroxyl group at each terminal, of the formula:

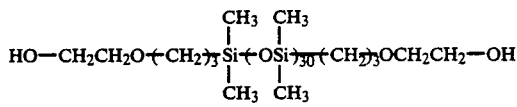

was used. The infrared absorption spectrum and proton nuclear magnetic resonance spectrum of this reaction product were measured and analyzed, whereby the product was ascertained to be a polysiloxane macromonomer (one type of macromonomer (D)) having a polymerizable group of the formula:

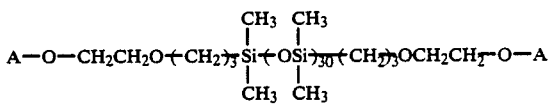

wherein A is

bonded to the siloxane main chain via one urethane bond.

EXAMPLES 48 to 59

In the same manner as in Example 1, various components were mixed to bring the composition as shown in Table 2 and polymerized to obtain a copolymer of a film form, which was processed to obtain test specimens. Then, with respect to the test specimens, various physical properties were measured in the same manner as in Example 1. The results are also shown in Table 2.

In Table 2, various abbreviations have the following meanings:

6FA: 2,2,2,2',2',2'-Hexafluoroisopropyl acrylate
BuA: Butyl acrylate
EDMA: Ethylene glycol dimethacrylate
V-65: Azobisdimethylvaleronitrile The proportions of the blend components in Table 2 are all represented by parts by weight.

TABLE 2

| Example Nos. | Blend components | | | | | | Physical properties | | | | | | |
|---|---|---|---|---|---|---|---|---|---|---|---|---|---|
| | Monomer (A) | Monomer (B) | Macro-monomer (C) | Macro-monomer (D) | Cross-linking agent | Polymer-ization initia-tor | Penetration strength | | | Average thick-ness (mm) | Oxygen permea-tion coeffi-cient | Oleic acid swelling coeffi-cient (—) | Contact angle (°) | Water absorp-tivity (%) |
| | | | | | | | Penetra-tion resist-ance (g) | Elonga-tion (%) | Strength index (g·%/μm) | | | | | |
| 48 | 6FA 45 | BuA 30 | Ref. Ex. 1 10 | Ref. Ex. 7 15 | EDMA 0.5 | V-65 0.3 | 327.7 | 59.6 | 49 | 0.275 | 96.7 | 1.07 | 67 | 0.40 |
| 49 | 6FA 50 | BuA 25 | Ref. Ex. 1 10 | Ref. Ex. 7 15 | EDMA 0.5 | V-65 0.3 | 424.5 | 75.6 | 80 | 0.242 | 101.9 | 1.07 | 66 | 0.35 |
| 50 | 6FA 50 | BuA 25 | Ref. Ex. 1 10 | Ref. Ex. 8 15 | EDMA 0.5 | V-65 0.3 | 165.5 | 49.2 | 20 | 0.261 | 114.9 | 1.03 | 72 | 0.35 |
| 51 | 6FA 50 | BuA 25 | Ref. Ex. 1 10 | Ref. Ex. 9 15 | EDMA 0.5 | V-65 0.3 | 201.7 | 55.4 | 28 | 0.266 | 92.1 | 1.06 | 69 | 0.34 |
| 52 | 6FA 45 | BuA 30 | Ref. Ex. 1 10 | Ref. Ex. 9 15 | EDMA 0.5 | V-65 0.3 | 244.3 | 53.9 | 33 | 0.260 | 104.1 | 1.06 | 68 | 0.35 |
| 53 | 6FA 45 | BuA 25 | Ref. Ex. 1 10 | Ref. Ex. 9 20 | EDMA 0.5 | V-65 0.3 | 221.2 | 61.8 | 34 | 0.258 | 104.5 | 1.03 | 70 | 0.40 |
| 54 | 6FA 50 | BuA 25 | Ref. Ex. 2 10 | Ref. Ex. 7 15 | EDMA 0.5 | V-65 0.3 | 307.7 | 47.7 | 38 | 0.240 | 97.6 | 1.05 | 68 | 0.35 |
| 55 | 6FA 45 | BuA 30 | Ref. Ex. 1 10 | Ref. Ex. 7 20 | EDMA 0.5 | V-65 0.3 | 233.3 | 32.4 | 19 | 0.273 | 86.9 | 1.07 | 63 | 0.28 |
| 56 | 6FA 40 | BuA 30 | Ref. Ex. 1 10 | Ref. Ex. 7 20 | EDMA 0.5 | V-65 0.3 | 220.8 | 29.4 | 19 | 0.242 | 105.9 | 1.05 | 65 | 0.36 |
| 57 | 6FA 45 | BuA 20 | Ref. Ex. 1 10 | Ref. Ex. 7 20 | EDMA 0.5 | V-65 0.3 | 242.0 | 31.4 | 19 | 0.280 | 114.9 | 1.04 | 68 | 0.40 |
| 58 | 6FA 50 | BuA 30 | Ref. Ex. 1 10 | Ref. Ex. 8 15 | EDMA 0.5 | V-65 0.3 | 172.8 | 41.6 | 18 | 0.258 | 118.6 | 1.05 | 69 | 0.34 |
| 59 | 6FA 45 | BuA 25 | Ref. Ex. 1 10 | Ref. Ex. 10 15 | EDMA 0.5 | V-65 0.3 | 170.1 | 42.2 | 18 | 0.252 | 93.9 | 1.04 | 70 | 0.40 |

The test specimens obtained in Examples 48 to 59 all exhibited no substantial tackiness when their surface was touched by a finger tip, and the surface conditions were all excellent. Further, when the test specimens were folded back and released, they immediately returned to the initial state, thus indicating excellent resiliency, and they had flexibility suitable as a soft ocular lens material. Further, the test specimens immersed in water were visually observed, whereby their outer appearance was transparent and faultless.

REFERENCE EXAMPLE 11

Preparation of macromonomer (D)

Into a 1l four-necked flask equipped with a stirrer, a thermometer, a condenser and a dropping funnel, 229.5 g (0.03 mol) of a polydimethylsiloxane having two hydroxyl groups at each terminal, of the formula:

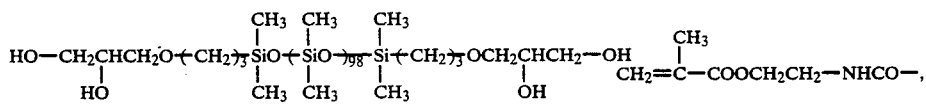

229.5 g of butyl acetate, 0.2 g of bis-tert-butylhydroxytoluene (hereinafter referred to as BHT) and 0.3 g of dibutyltin dilaurate were charged and stirred for mixing. The mixture in the flask was heated to 70° C., and a mixture comprising 18.6 g (0.12 mol) of 2-isocyanate ethyl methacrylate and 18.6 g of butyl acetate was dropwise added by means of a dropping funnel over a period of 30 minutes while maintaining the temperature at a level of from 70° to 80° C. Then, stirring was continued at 80° C. for 3 hours. This reaction solution was sampled, and a predetermined amount of di-n-butylamine was added and mixed, and then the remaining isocyanate was quantitatively analyzed by potentiometric titration by means of hydrochloric acid, whereby the reaction rate was found to be 100%. To the above reaction solution, 20 g of ethanol was added, and the mixture was stirred at 70° C. for 1 hour and then subjected to active carbon treatment. Then, the solvent and low boiling point substances were removed under reduced pressure at 80° C. to obtain 228.5 g of the reaction product. The reaction product had a viscosity of 1030 cSt (at 25° C.), a specific gravity of 0.990 (at 25° C.) and a refractive index of 1.4120 (at 25° C.).

Then, the infrared absorption spectrum and proton nuclear magnetic resonance spectrum were measured and analyzed, whereby the product was ascertained to be a polysiloxane macromonomer (one type of macromonomer (D)) having a polymerizable group of the formula:

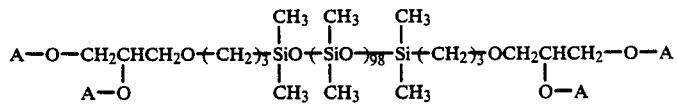

wherein A is

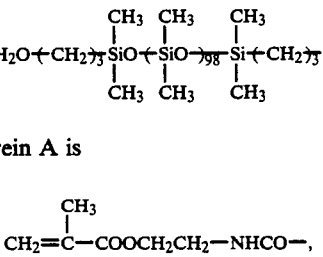

bonded to the siloxane main chain via one urethane bond.

REFERENCE EXAMPLE 12

Preparation of macromonomer (D)

A polysiloxane macromonomer (one type of macromonomer (D)) having a polymerizable group of the formula:

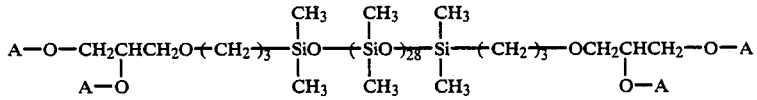

wherein A is $$CH_2=C(CH_3)-COOCH_2CH_2-NHCO-,$$

bonded to the siloxane main chain via one urethane bond, prepared in the same manner as in Reference Example 11 except that a polydimethylsiloxane having two hydroxyl group at each terminal, of the formula:

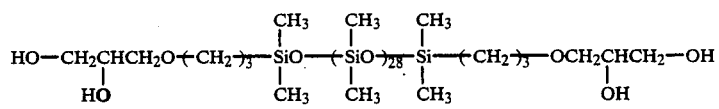

was used.

REFERENCE EXAMPLE 13

Preparation of macromonomer (D)

Into a 500 ml four-necked flask equipped with a stirrer, a thermometer, a condenser and a dropping funnel, 88.9 g (0.4 mol) of isophorone diisocyanate, 88.9 g of butyl acetate, 0.14 g of BHT and 1.0 g of dibutyl tin dilaurate were charged and stirred for mixing. The mixture in the flask was heated to 70° C., and a mixture comprising 46.4 g (0.4 mol) of 2-hydroxyethyl acrylate and 46.4 g of butyl acetate, was dropwise added by means of the dropping funnel over a period of 40 minutes while maintaining the temperature at a level of from 70° to 80° C. Then, stirring was continued at 75° C. for 3 hours, and then the reaction solution was cooled.

The isocyanate equivalent of this reaction solution was measured and found to be 686 g/mol, and the isocyanate group-remaining rate (to the theoretical value) was 99%.

Into a 1l four-necked flask equipped with the same apparatus as in Reference Example 11, 185.3 g (0.075 mol) of a polydimethylsiloxane having two hydroxyl groups at each terminal, of the formula:

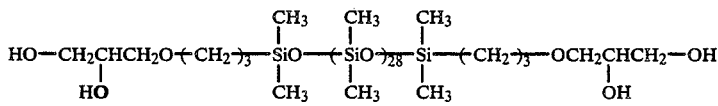

185.3 g of butyl acetate, 0.2 g of BHT and 0.4 g of dibutyl tin dilaurate were charged and stirred for mixing. The mixture in the flask was heated to 70° C., and 205.8 g (isocyanate group content: 0.3 equivalent) of the above-mentioned reaction solution was dropwise added thereto by means of the dropping funnel over a period of 30 minutes while maintaining the temperature at a level of from 70° to 80° C. Thereafter, the stirring was continued at 80° C. for 3 hours. The reaction rate was determined in the same manner as in Reference Example 11 and found to be 100%. To this reaction solution, 35 g of ethanol was added, and the mixture was stirred at 70° C. for 1 hour and then subjected to active carbon treatment. Then, the solvent and low boiling point substances were removed under reduced pressure at 80° C. to obtain 267.3 g of a highly viscous reaction product. The reaction product in a 50 wt% ethyl acetate solution had a viscosity of 68.2 cSt (at 25° C.), a specific gravity of 0.964 (at 25° C.) and a refractive index of 1.4048 (at 25° C.).

Then, the infrared absorption spectrum and proton nuclear magnetic resonance spectrum were measured and analyzed, whereby the product was ascertained to be a polysiloxane macromonomer (one type of macromonomer (D)) having a polymerizable group of the formula:

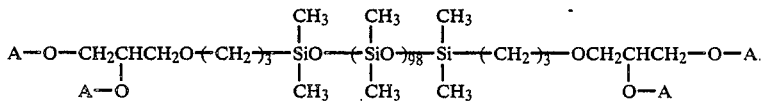

wherein A is

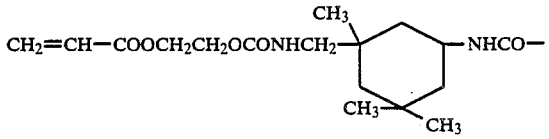

bonded to the siloxane main chain via two urethane bonds.

REFERENCE EXAMPLE 14

Preparation of macromonomer (D)

A polysiloxane macromonomer (one type of macromonomer (D)) having a polymerizable group of the formula:

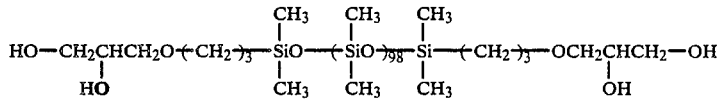

wherein A is

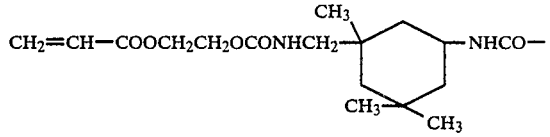

bonded to the siloxane main chain via two urethane bonds, was prepared in the same as in Reference Example 13 except that a polydimethylsiloxane having two hydroxyl groups at each terminal, of the formula:.

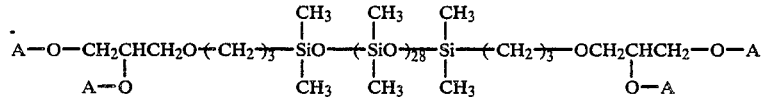

was used.

REFERENCE EXAMPLE 15

Preparation of macromonomer (D) A polysiloxane macromonomer (one type of macromonomer (D)) having a polymerizable group of the formula:

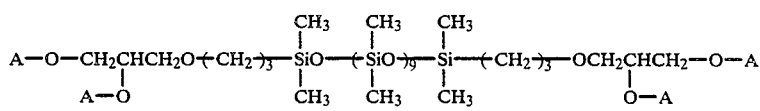

wherein A is

bonded to the siloxane main chain via one urethane bond, was prepared in the same manner as in Reference Example 11 except that a polydimethylsiloxane having two hydroxyl groups at each terminal, of the formula:

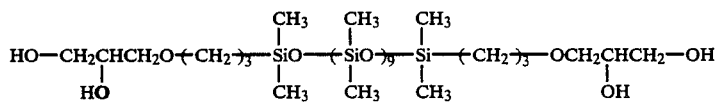

was used.

REFERENCE EXAMPLE 16

Preparation of macromonomer (D)

A polysiloxane macromonomer (one type of macromonomer (D)) having a polymerizable group of the formula:

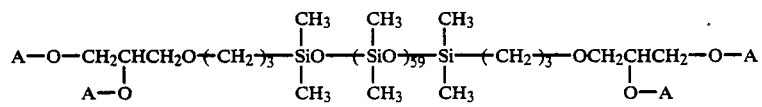

wherein A is

bonded to the siloxane main chain via one urethane bond, was prepared in the same manner as in Reference Example 11 except that a polydimethylsiloxane having two hydroxyl groups at each terminal, of the formula:

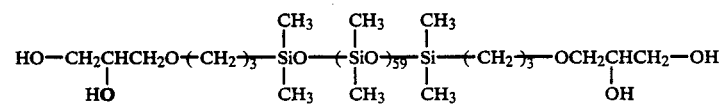

was used.

REFERENCE EXAMPLE 17

Preparation of macromonomer (D)

A polysiloxane macromonomer (one type of macromonomer (D)) having a polymerizable group of the formula:

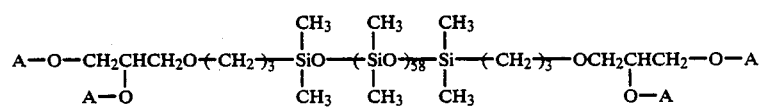

wherein A is

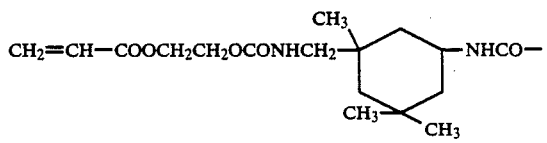

bonded to the siloxane main chain via two urethane bonds, was prepared in the same manner as in Reference Example 13 except that a polydimethylsiloxane having two hydroxyl groups at each terminal, of the formula:

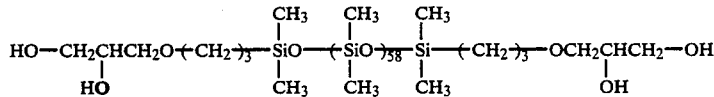

was used.

EXAMPLES 60 to 77

In the same manner as in Example 1, various components were mixed to bring the composition as shown in Table 3 and polymerized to obtain a copolymer of a film form, which was processed to obtain test specimens.

Then, with respect to the test specimens, various physical properties were measured in the same manner as in Example 1. The results are also shown in Table 3.

In Table 3, various abbreviations have the following meanings:
6FA: 2,2,2,2',2',2'-Hexafluoroisopropyl acrylate
BuA: Butyl acrylate
EDMA: Ethylene glycol dimethacrylate
V-65 Azobisdimethylvaleronitrile The proportions of the blend components in Table 3 are all represented by parts by weight.

TABLE 3

| Example Nos. | Blend components ||||||| Penetration strength ||| Physical properties ||||| 
|---|---|---|---|---|---|---|---|---|---|---|---|---|---|---|---|
| | Monomer (A) | Monomer (B) | Macro-monomer (C) | Macro-monomer (D) | Cross-link-ing agent | Polymer-ization initia-tor | Penetra-tion resist-ance (g) | Elonga-tion (%) | Strength index (g·%/μm) | Average thick-ness (mm) | Oxygen permea-tion coeffi-cient | Oleic acid swelling coeffi-cient (—) | Contact angle (°) | Water absorp-tivity (%) |
| 60 | 6FA 40 | BuA 30 | Ref. Ex. 1 10 | Ref. Ex. 12 20 | EDMA 0.5 | V-65 0.3 | 185.0 | 49.0 | 23 | 0.263 | 96.1 | 1.05 | 60 | 0.35 |
| 61 | 6FA 45 | BuA 30 | Ref. Ex. 1 10 | Ref. Ex. 12 15 | EDMA 0.5 | V-65 0.3 | 193.2 | 60.4 | 30 | 0.217 | 93.1 | 1.03 | 67 | 0.38 |
| 62 | 6FA 45 | BuA 25 | Ref. Ex. 1 10 | Ref. Ex. 12 20 | EDMA 0.5 | V-65 0.3 | 190.1 | 51.9 | 25 | 0.236 | 92.3 | 1.04 | 65 | 0.38 |
| 63 | 6FA 50 | BuA 25 | Ref. Ex. 1 10 | Ref. Ex. 12 15 | EDMA 0.5 | V-65 0.3 | 186.6 | 59.5 | 28 | 0.239 | 99.7 | 1.03 | 65 | 0.28 |
| 64 | 6FA 50 | BuA 20 | Ref. Ex. 1 10 | Ref. Ex. 12 20 | EDMA 0.5 | V-65 0.3 | 266.5 | 67.1 | 45 | 0.251 | 103.7 | 1.03 | 66 | 0.40 |
| 65 | 6FA 45 | BuA 20 | Ref. Ex. 2 20 | Ref. Ex. 12 15 | EDMA 0.5 | V-65 0.3 | 176.7 | 47.9 | 22 | 0.273 | 100.2 | 1.03 | 72 | 0.37 |
| 66 | 6FA 50 | BuA 25 | Ref. Ex. 1 10 | Ref. Ex. 11 15 | EDMA 0.5 | V-65 0.3 | 154.1 | 69.2 | 27 | 0.257 | 110.5 | 1.04 | 80 | 0.28 |
| 67 | 6FA 40 | BuA 35 | Ref. Ex. 1 10 | Ref. Ex. 13 15 | EDMA 0.5 | V-65 0.3 | 233.0 | 52.7 | 31 | 0.252 | 78.2 | 1.04 | 60 | 0.20 |
| 68 | 6FA 45 | BuA 35 | Ref. Ex. 1 10 | Ref. Ex. 13 10 | EDMA 0.5 | V-65 0.3 | 203.4 | 72.2 | 37 | 0.274 | 83.5 | 1.05 | 62 | 0.18 |
| 69 | 6FA 45 | BuA 30 | Ref. Ex. 1 10 | Ref. Ex. 13 15 | EDMA 0.5 | V-65 0.3 | 277.1 | 76.7 | 53 | 0.272 | 84.0 | 1.04 | 62 | 0.28 |
| 70 | 6FA 45 | BuA 25 | Ref. Ex. 1 10 | Ref. Ex. 13 20 | EDMA 0.5 | V-65 0.3 | 421.3 | 81.9 | 86 | 0.255 | 88.0 | 1.03 | 61 | 0.32 |
| 71 | 6FA 50 | BuA 25 | Ref. Ex. 1 10 | Ref. Ex. 13 15 | EDMA 0.5 | V-65 0.3 | 334.4 | 77.3 | 65 | 0.254 | 87.2 | 1.03 | 60 | 0.25 |
| 72 | 6FA 40 | BuA 35 | Ref. Ex. 1 10 | Ref. Ex. 14 15 | EDMA 0.5 | V-65 0.3 | 154.3 | 103.6 | 40 | 0.255 | 100.2 | 1.05 | 62 | 0.24 |
| 73 | 6FA 45 | BuA 35 | Ref. Ex. 1 10 | Ref. Ex. 14 10 | EDMA 0.5 | V-65 0.3 | 166.7 | 101.8 | 42 | 0.260 | 93.5 | 1.05 | 63 | 0.28 |
| 74 | 6FA 45 | BuA 25 | Ref. Ex. 1 5 | Ref. Ex. 12 15 | EDMA 0.5 | V-65 0.3 | 154.2 | 56.4 | 22 | 0.228 | 87.0 | 1.02 | 64 | 0.28 |
| 75 | 6FA 50 | BuA 25 | Ref. Ex. 1 10 | Ref. Ex. 15 15 | EDMA 0.5 | V-65 0.3 | 504 | 37 | 47 | 0.245 | 84.2 | 1.02 | 46 | 0.40 |
| 76 | 6FA 50 | BuA 25 | Ref. Ex. 1 10 | Ref. Ex. 16 15 | EDMA 0.5 | V-65 0.3 | 168 | 57 | 24 | 0.251 | 114.7 | 1.02 | 50 | 0.31 |
| 77 | 6FA 50 | BuA 25 | Ref. Ex. 1 10 | Ref. Ex. 17 15 | EDMA 0.5 | V-65 0.3 | 228 | 73 | 42 | 0.260 | 134.8 | 1.02 | 46 | 0.08 |

The test specimens obtained in Examples 60 to 77 all exhibited no substantial tackiness when their surface was touched by a finger tip, and the surface conditions were all excellent. Further, when the test specimens were folded back and released, they immediately returned to the initial state, thus indicating excellent resiliency, and they had flexibility suitable as a soft ocular lens material. Further, the test specimens immersed in water were visually observed, whereby their outer appearance was transparent and faultless.

COMPARATIVE EXAMPLE 1

Commercially available non-water absorptive contact lenses

Commercially available non-water absorptive contact lenses (Sofina, tradename, manufactured by Kabushiki Kaisha Rikki Contact Lens Kenkyusho) were used as test specimens, and various physical properties were measured in the same manner as in Example 1. The results are shown in Table 4.

COMPARATIVE EXAMPLE 2

Case wherein monomer (A), maoromonomer (C) and macromonomer (D) are not used

Various components were mixed in the same manner as in Example 1 to bring the composition as shown in Table 4 and polymerized to obtain a copolymer of a film form, which was processed to obtain test specimens. With respect to the test specimens thus obtained, various physical properties were measured in the same manner as in Example 1. The results are shown in Table 4.

COMPARATIVE EXAMPLES 3 to 5

Case wherein macromonomer (D) is not used

Various components were mixed in the same manner as in Example 1 to bring the composition as shown in Table 4 and polymerized to obtain a copolymer of a film form, which was processed to obtain test specimens. With respect to the test specimens thus obtained, various physical properties were measured in the same manner as in Example 1. The results are shown in Table 4.

COMPARATIVE EXAMPLES 6 to 7

Case wherein macromonomer (C) is not used

Various components were mixed in the same manner as in Example 1 to bring the composition as shown in Table 4 and polymerized to obtain a copolymer of a film form, which was processed to obtain test specimens. With respect to the test specimens thus obtained, various physical properties were measured in the same manner as in Example 1. The results are shown in Table 4.

COMPARATIVE EXAMPLES 8 to 12

Case wherein monomer (A) is not used

Various components were mixed in the same manner as in Example 1 to bring the composition as shown in Table 4 and polymerized to obtain a copolymer of a film form, which was processed to obtain test specimens. With respect to the test specimens thus obtained, various physical properties were measured in the same manner as in Example 1. The results are shown in Table 4.

COMPARATIVE EXAMPLES 13 and 14

Case wherein monomer (B) is not used

Various components were mixed in the same manner as in Example 1 to bring the composition as shown in Table 4, they did not dissolve uniformly. Therefore, the mixture was not suitable for polymerization.

In Table 4, various abbreviations and the units of the proportions of the blend components are the same as in Table 1.

TABLE 4

| Comparative Example Nos. | Blend components | | | | | | | Penetration strength | | | Physical properties | | | | |
|---|---|---|---|---|---|---|---|---|---|---|---|---|---|---|---|
| | Monomer (A) | Monomer (B) | Macromonomer (C) | Macromonomer (D) | Crosslinking agent | Other copolymer components | Polymerization initiator | Penetration resistance (g) | Elongation (%) | Strength index (g·%/μm) | Average thickness (mm) | Oxygen permeation coefficient | Oleic acid swelling coefficient (—) | Contact angle (°) | Water absorptivity (%) |
| 1*1 | — | BuA 100 | — | — | EDMA 0.3 | — | V-65 0.5 | 232.0 | 37.4 | 19 | 0.220 | 30.0 | 1.23 | — | — |
| 2*2 | — | — | — | — | — | — | — | 55.5 | 159.2 | 22 | 0.273 | 38.7 | 1.91 | — | — |
| 3 | 6FA 42 | BuA 30 | Ref. Ex. 1 28 | — | EDMA 1.0 | — | V-65 0.3 | 138.4 | 40.9 | 15 | 0.267 | 109.7 | 1.02 | 71 | 0.49 |
| 4 | 6FA 35 | BuA 30 | Ref. Ex. 1 35 | — | EDMA 1.0 | — | V-65 0.3 | 130.3 | 32.5 | 11 | 0.280 | 116.4 | 1.02 | 70 | 0.65 |
| 5 | 6FA 28 | BuA 30 | Ref. Ex. 1 42 | — | EDMA 1.0 | — | V-65 0.3 | 147.3 | 32.5 | 13 | 0.268 | 120.5 | 1.03 | 65 | 0.47 |
| 6 | 6FA 47.5 | Bu 47.5 | — | Ref. Ex. 4 5 | EDMA 0.5 | — | V-65 0.3 | 106.7 | 161.8 | 43 | 0.210 | 49.9 | 1.14 | 66 | 0.70 |
| 7 | 6FA 45 | BuA 45 | — | Ref. Ex. 4 10 | EDMA 0.5 | — | V-65 0.3 | 139.1 | 89.6 | 32 | 0.267 | 67.5 | 1.12 | 65 | 0.40 |
| 8 | — | BuA 70 | Ref. Ex. 1 10 | Ref. Ex. 4 20 | EDMA 0.5 | — | V-65 0.3 | 134.6 | 38.5 | 13 | 0.285 | 72.2 | 1.33 | 58 | 0.96 |
| 9 | — | BuA 60 | Ref. Ex. 1 20 | Ref. Ex. 4 20 | EDMA 0.5 | — | V-65 0.3 | 131.6 | 32.5 | 11 | 0.293 | 89.9 | 1.25 | 56 | 1.53 |
| 10 | — | BuA 75 | Ref. Ex. 1 10 | Ref. Ex. 4 15 | EDMA 0.5 | — | V-65 0.3 | 109.5 | 35.9 | 10 | 0.280 | 73.2 | 1.37 | 60 | 1.17 |
| 11 | — | BuA 65 | Ref. Ex. 1 20 | Ref. Ex. 4 15 | EDMA 0.5 | — | V-65 0.3 | 57.9 | 40.7 | 6 | 0.261 | 102.7 | 1.30 | 58 | 1.92 |
| 12 | — | BuA 55 | Ref. Ex. 1 30 | Ref. Ex. 4 15 | EDMA 0.5 | — | V-65 0.3 | 52.3 | 30.1 | 4 | 0.278 | 106.8 | 1.25 | 60 | 3.07 |
| 13 | 6FA 60 | — | Ref. Ex. 1 25 | Ref. Ex. 4 15 | EDMA 0.5 | — | V-65 0.3 | — | — | — | — | — | — | — | — |
| 14 | 6FA 50 | — | Ref. Ex. 1 30 | Ref. Ex. 4 20 | EDMA 0.5 | — | V-65 0.3 | — | — | — | — | — | — | — | — |

Note
*1 Since this is a commercial product, the blend components are unknown. Further, since the test specimen was in the form of a lens, the contact angle and water absorptivity were not measured.
*2 The surface was so tacky that it was impossible to measure the contact angle and the water absorptivity.

All of the products obtained in Examples 1 to 77 had a penetration resistance of at least 154 g, a strength index of at least 18, an oxygen permeation coefficient of at least $78 \times 10^{-11}$ and an oleic acid swelling coefficient of not higher than 1.18.

Whereas, the contact lens used in Comparative Example 1 had an oxygen permeation coefficient of $30.0 \times 10^{-11}$, which is far less as compared with the products obtained in Examples 1 to 77. Further, the oleic acid swelling coefficient is 1.23, which is inferior to the products obtained in Examples 1 to 77 and which indicates that lipids are likely to adhere. Further, such contact lenses had a tacky surface and can not be regarded favorable.

The product obtained in Comparative Example 2 had a penetration resistance of 55.5 g, which is substantially low as compared with the products obtained in Examples 1 to 77, and thus lacks in mechanical strength. The oxygen permeation coefficient is $38.7 \times 10^{-11}$, which is far less as compared with the products obtained in Examples 1 to 77. The oleic acid swelling coefficient is 1.91, which is substantially inferior to the products obtained in Examples 1 to 77 and which indicates the lipids are likely to adhere. Further, the product obtained in Comparative Example 2 had a tacky surface and poor resiliency, and thus it can not be regarded as favorable.

The products obtained Comparative Examples 3 to 5 had a penetration resistance of not higher than 148 g, which is substantially low as compared with the products obtained in Examples 1 to 77, and thus they are inferior in the mechanical strength. The strength indices were from 11 to 15, which is low as compared with the products obtained in Examples 1 to 77, and thus the products lack in the mechanical strength and can not be regarded as favorable.

The products obtained in Comparative Examples 6 and 7 had a penetration resistance of not higher than 140 g and an oxygen permeation coefficient of not higher than $68 \times 10^{-11}$, which are substantially low as compared with the products obtained in Examples 1 to 77, and they can not be regarded as favorable.

The products obtained in Comparative Examples 8 to 12 had a penetration resistance of not higher than 135 g and a strength index of not higher than 13, which are substantially low as compared with the products obtained in Examples 1 to 77, and thus they lack in mechanical strength. The oleic acid swelling coefficient is at least 1.25, which is inferior to the products obtained in Examples 1 to 77, and which indicates that lipids are likely to adhere. Thus, they can not be regarded as favorable.

EXAMPLE 78

The test specimen of the material obtained in Example 9 was subjected to alkali treatment by immersing the test specimen in an aqueous solution containing sodium hydroxide at a concentration of 0.5% by weight at 70° C. for 3 hours. The test specimen was taken out from the aqueous alkaline solution, rinsed with running water, cleaned with a contact lens cleaner (Meniclean, tradename, manufactured by Menicon Co., Ltd.), again rinsed with running water and then rinsed with distilled water.

The degree of the hydrophilicity imparted to the surface of the material was evaluated by comparing the contact angle after the alkali treatment and the contact angle prior to the treatment. The contact angle was measured by a liquid dropping method at room temperature by means of a contact angle measuring apparatus CA-A (manufactured by Kyowa Kaimen Kagaku K.K.).

EXAMPLES 79 to 88

In the same manner as in Example 78, a test specimen of the material of each Example as identified in Table 5 was subjected to alkali treatment under the respective conditions as identified in Table 5, and the contact angle was measured by a liquid dropping method to evaluate the hydrophilicity of the surface of the material.

In Table 5, "No" for the "acid treatment" under "Treating conditions" means that the test specimen was immersed in the aqueous alkaline solution, then taken out, rinsed with running water, cleaned with the contact lens cleaner (Meniclean, tradename, manufactured by Menicon Co., Ltd.), again rinsed with running water and then rinsed with distilled water, and "Yes" means that the test specimen was immersed in the aqueous alkaline solution, then taken out, rinsed with running water, acidified by dipping it in a 2 wt % hydrochloric acid aqueous solution for 1 minute, taken out, rinsed with running water, cleaned with the contact lens cleaner (Meniclean, tradename, manufactured by Menicon Co., Ltd.), again rinsed with running water and then rinsed with distilled water.

It is evident from the results of Examples 78 to 88 that hydrophilicity was imparted to the surface of the soft ocular lens materials of the present invention by the alkali treatment.

TABLE 5

| Example Nos. | Example No. of the material subjected to alkali treatment | Treating conditions | | | | | Contact angle (°) | |
|---|---|---|---|---|---|---|---|---|
| | | Alkali | | | | Acid treatment | Before the treatment | After the treatment |
| | | Type | Conc. (wt %) | Temp. (°C.) | Time | | | |
| 78 | 9 | NaOH | 0.5 | 70 | 3 hrs. | No | 101 | 90.2 |
| 79 | 10 | NaOH | 5 | 70 | 1 hr. | Yes | 98 | 74 |
| 80 | 10 | NaOH | 5 | 70 | 6 hrs. | Yes | 98 | 38 |
| 81 | 17 | NaOH | 20 | 35 | 2 hrs. | Yes | 90 | 70 |
| 82 | 25 | NaOH | 5 | 25 | 3 days | Yes | 95 | 69 |
| 83 | 28 | NaOH | 5 | 50 | 6 hrs. | No | 103 | 84 |
| 84 | 45 | NaOH | 5 | 50 | 2 hrs. | Yes | 108 | 99 |
| 85 | 47 | NaOH | 10 | 50 | 4 hrs. | No | 104 | 90 |
| 86 | 50 | NaOH | 2.5 | 35 | 6 hrs. | No | 103 | 89 |
| 87 | 54 | NaOH | 2.5 | 35 | 3 hrs. | No | 103 | 92 |
| 88 | 76 | NH$_4$OH | 5 | 35 | 3 days | No | 102 | 92 |

EXAMPLES 89 to 91

A test specimen having a size of 1.5 cm×7 cm and a thickness of 0.3 mm was prepared from the copolymer of a flexible and transparent film form obtained in each of Examples 28, 39 and 51. The test specimen was subjected to alkali treatment in the same manner as in Example 78 under the treating conditions as identified in Table 6.

The decrease in the tackiness of the surface of the material was evaluated by comparing the peel strength and the tack inclination angle as between before and after the alkali treatment. The peel strength and the tack inclination angle were measured as follows.

Peel strength

The test specimen of a film form was cut into two test pieces each having a size of 0.8 cm×3 cm. These test pieces were overlaid one on the other, and a load of 200 g was exerted thereon for 30 seconds. An end of each test piece was nipped by a chuck, with a portion of about 0.5 mm from the edge of the test piece being the nipped portion. One of the chucks was secured to a table and the other chuck was pulled by an instron type tensile tester to peel the test pieces from each other, whereby the force (g) recorded, was taken as the peel strength. The smaller the peel strength, the less the tackiness.

Tack inclination angle

The test specimen of a film form was sticked on an inclined plate, the angle of which was freely adjustable. Then, a bearing ball made of a high carbon chromium steel having a diameter of 1/16 inch (about 1.6 mm) was permitted to roll down on the test specimen from a position 10 cm above the test specimen. The angle (°) of the inclination when the ball sticked to the test specimen and stopped rolling, was taken as the tack inclination angle. The larger the angle, the higher the tackiness.

the various physical properties which are satisfied by the present invention.

The ocular lens material of the present invention is soft and substantially non-water absorptive or of a low water absorptivity. Stains such as lipids scarcely adhere thereto, and the material is free from tackiness on its surface. It is excellent in the oxygen permeability. Yet, it is a transparent ocular lens material having improved mechanical strength.

Since the ocular lens material of the present invention is soft, it is suitable for use as a soft contact lens material which presents a comfortable feeling to the wearer, or as an intraocular lens material which can readily be inserted in a deformed shape through a small incision without damaging the ocular tissues.

Further, since the ocular lens material of the present invention is substantially non-water absorptive or of a low water absorptivity, it is free from a deterioration of the mechanical strength due to an increase of the water content and free from a deterioration of the dimensional stability required for a lens. Further, bacteria and the like hardly propagate in the material, and when used as a contact lens, it is free from cumbersome treatment such as boiling for sterilization.

Furthermore, since the ocular lens material of the present invention is excellent in the oxygen permeability, it does not impair the metabolic function of the cornea when it is used as a contact lens.

Still further, since the ocular lens material of the present invention has excellent mechanical strength, and it is thereby possible to obtain a lens having an excellent dimensional stability, which is durable against various physical treatments.

Moreover, since stains such as lipids scarcely adhere to the ocular contact lens material of the present invention, the material is free from turbidity of lens due to the stains, and yet it is free from surface tackiness, whereby a trouble such as adhesion to the ocular tissues scarcely occurs.

Further, by the alkali treatment, the hydrophilicity

TABLE 6

| Example Nos. | Example No. of the material subjected to alkali treatment | Alkali treatment conditions | | | | Acid treatment | Peel strength (g) | | Tack inclination angle (°) | |
|---|---|---|---|---|---|---|---|---|---|---|
| | | Alkali | | | | | Before alkali treatment | After alkali treatment | Before alkali treatment | After alkali treatment |
| | | Type | Conc. (wt %) | Temp. (°C.) | Time | | | | | |
| 89 | 28 | NaOH | 5 | 50 | 3 hrs. | No | 4.0 | 0.3 | At least 29.5 | At most 1.9 |
| 90 | 39 | NaOH | 5 | 35 | 24 hrs. | No | 1.5 | 0.9 | at least 29.5 | At most 1.9 |
| 91 | 51 | NaOH | 5 | 70 | 1 hr. | No | 2.0 | 0.2 | at least 29.5 | At most 1.9 |

As is evident from the results of Examples 89 to 91, the tackiness of the surface of the soft contact lens material of the present invention, is substantially reduced by the alkali treatment.

From the foregoing, it is evident that the ocular lens material of the present invention has no surface tackiness and is hardly stained with lipids, by virtue of the effects of the monomer (A). Further, by virtue of synergistic effects of macromonomers (C) and (D), the mechanical strength is sufficiently reinforced and improved over the conventional non-water absorptive soft contact lens materials, and the oxygen permeability is also remarkably improved. Namely, there has been no conventional ocular lens material which fully satisfies and non-tackiness of the surface can further be improved to present a material which is very useful as an ocular lens.

We claim:

1. A soft ocular lens material made of a copolymer consisting essentially of:
   (A) from 5 to 70 parts by weight of a fluorine-containing (meth)acrylate of the formula III:

$$CH_2=CR^7COOC_pH_{(2p-q-r=1)}F_q(OH)_r \qquad (III)$$

wherein $R_7$ represents a hydrogen atom or a methyl groups, p is an integer of form 1 to 15, q is an integer of from 1 to (2p+1), and r is an integer of from 0 to 2.

(B) from 5 to 60 parts by weight of an alkyl (meth)acrylate;

(C) from 3 to 45 parts by weight of a polysiloxane macromonomer having polymerizable groups at both terminals, of the formula I:

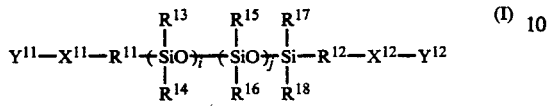

wherein each of $Y^{11}$ and $Y^{12}$ independently represents an acryloyl group, a methacryloyl group, a vinyl group or an allyl group; each of $X^{11}$ and $X^{12}$ independently represents a covalent bond, an oxygen atom or an alkylene glycol group; each of $R^{11}$ and $R^{12}$ independently represents a linear or branched alkylene group having from 1 to 6 carbon atoms; each of $R^{13}$, $R^{14}$, $R^{15}$, $R^{16}$, $R^{17}$ and $R^{18}$ independently represents an alkyl group having from 1 to 3 carbon atoms or a phenyl group; i is an integer of from 1 to 1500; and j is an integer of from 0 to 1499 (provided that i+j is at most 1500); and (D) from 3 to 40 parts by weight of a polysiloxane macromonomer having polymerizable groups bonded via one or two urethane bonds to the siloxane main chain, of the formula II:

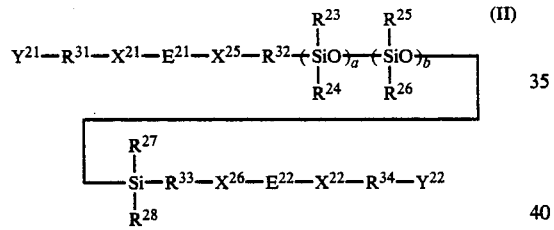

wherein each of $Y^{21}$ and $Y^{22}$ independently represents a group selected from the group consisting of an acryloyloxy group, a methacryloyloxy group, a vinyl group and an allyl group; each of $R^{31}$ and $R^{34}$ independently represents a linear or branched alkylene group having from 2 to 6 carbon atoms; each of $X^{21}$ and $X^{22}$ independently represents a covalent bond, an oxygen atom or an alkylene glycol group; each of $R^{32}$ and $R^{33}$ independently represents a linear or branched alkylene group having from 1 to 6 carbon atoms; each of $R^{23}$, $R^{24}$, $R^{25}$, $R^{26}$, $R^{27}$ and $R^{28}$ independently represents an alkyl group having from 1 to 3 carbon atoms or a phenyl group; each of $E^{21}$ and $E^{22}$ independently represents —NHCO— (provided that in this case, each of $X^{21}$ and $X^{22}$ is a covalent bond, $E^{21}$ forms a urethane bond together with $X^{25}$, and $E^{22}$ forms a urethane bond together with $X^{26}$) or a bivalent group derived from a diisocyanate selected from the group consisting of saturated aliphatic, alicyclic and aromatic diisocyanates (provided that in this case, $X^{21}$ and $X^{22}$ independently represents an oxygen atom or an alkylene glycol group, $E^{21}$ forms a urethane bond together with $X^{21}$ and $X^{25}$, and $E^{22}$ forms a urethane bond together with $X^{22}$ and $X^{26}$); each of $X^{25}$ and $X^{26}$ independently represents an oxygen atom, an alkylene glycol or a group represented by the formula V:

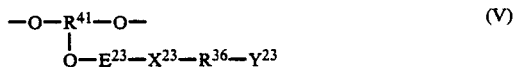

wherein $R^{41}$ is a trivalent hydrocarbon group having from 1 to 6 carbon atoms; $Y^{23}$ represents a group selected from the group consisting of an acryloyloxy group, a methacryloyloxy group, a vinyl group and a allyl group; $R^{36}$ represents a linear or branched alkylene group having from 2 to 6 carbon atoms; $X^{23}$ represents a covalent bond, an oxygen atom or an alkylene glycol group; $E^{23}$ represents —NHCO— (provided that in this case, $X^{23}$ is a covalent bond) or a bivalent group derived from a diisocyanate selected from the group consisting of saturated aliphatic, alicyclic and aromatic diisocyanates (provided that in this case, $X^{23}$ is an oxygen atom or an alkylene glycol group), which forms a urethane bond together with $X^{23}$ and the adjacent oxygen atom bonded to $R^{41}$; a is an integer of from 1 to 1500; and b is an integer of from 0 to 1499, provided $a+b \leq 1500$; as essential copolymer components.

2. The soft ocular lens material according to claim 1, wherein the polysiloxane macromonomer (D) is a macromonomer of the formula VII:

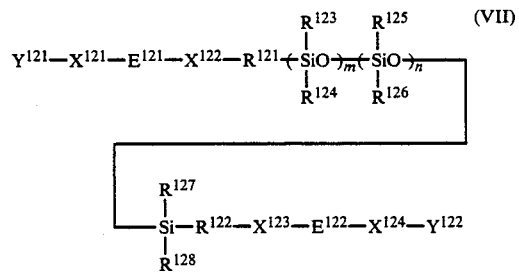

wherein each of $Y^{121}$ and $Y^{122}$ independently represents an acryloyl group, a methacryloyl group, a vinyl group or an allyl group; each of $X^{121}$, $X^{122}$, $X^{123}$ and $X^{124}$ independently represents an oxygen atom or an alkylene glycol group; each of $R^{121}$ and $R^{122}$ independently represents a linear or branched alkylene group having from 1 to 6 carbon atoms; each of $R^{123}$, $R^{124}$, $R^{125}$, $R^{126}$, $R^{127}$ and $R^{128}$ independently represents an alkyl group having from 1 to 3 carbon atoms or a phenyl group; each of $E^{121}$ and $E^{122}$ independently represents a bivalent group derived from a saturated aliphatic, alicyclic or aromatic diisocyanate, and $E^{121}$ forms a urethane bond together with $X^{121}$ and $X^{122}$, and $E^{122}$ forms a urethane bond together with $X^{123}$ and $X^{124}$; m is an integer of from 1 to 1500; and n is an integer of from 0 to 1499 (provided m+n is not more than 1500).

3. The soft ocular lens material according to claim 1, wherein the polysiloxane macromonomer (D) is a macromonomer of the formula VIII:

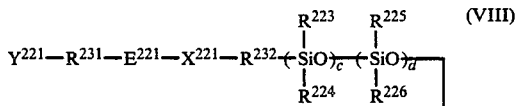

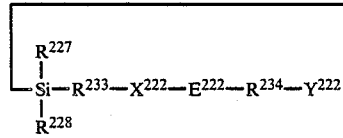

wherein each of $Y^{221}$ and $Y^{222}$ independently represents an acryloyloxy group, a methacryloyloxy group, a vinyl group or an allyl group, each of $R^{231}$ and $R^{234}$ independently represents a linear or branched alkylene group having from 2 to 6 carbon atoms; each of $X^{221}$ and $X^{222}$ independently represents an oxygen atom or an alkylene glycol group; each of $R^{232}$ and $R^{233}$ independently represents a linear or branched alkylene group having from 1 to 6 carbon atoms; each of $R^{223}$, $R^{224}$, $R^{225}$, $R^{226}$, $R^{227}$ and $R^{228}$ independently represents an alkyl group having from 1 to 3 carbon atoms or a phenyl group; each of $E^{221}$ and $E^{222}$ independently represents —NHCO—; c is an integer of from 1 to 1500; and d is an integer of from 0 to 1499, provided c+d is not more than 1500.

4. The soft ocular lens material according to claim 1, wherein the polysiloxane macromonomer (D) is a macromonomer of the formula IX:

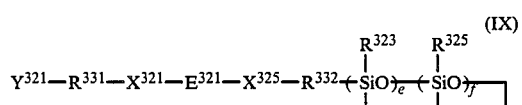

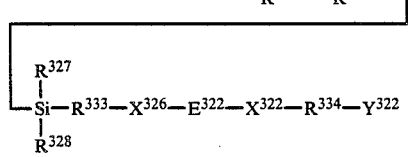

wherein each of $Y^{321}$ and $Y^{322}$ independently represents a group selected from the group consisting of an acryloyloxy group, a methacryloyloxy group, a vinyl group and an allyl group; each of $R^{331}$ and $R^{334}$ independently represents a linear or branched alkylene group having from 2 to 6 carbon atoms; each of $X^{321}$ and $X^{322}$ independently represents a covalent bond, an oxygen atom or an alkylene glycol group; each of $R^{332}$ and $R^{333}$ independently represents a linear or branched alkylene group having from 1 to 6 carbon atoms; each of $R^{323}$, $R^{324}$, $R^{325}$, $R^{326}$, $R^{327}$ and $R^{328}$ independently represents an alkyl group having from 1 to 3 carbon atoms or a phenyl group; each of $E^{321}$ and $E^{322}$ independently represents —NHCO— (provided that in this case, each of $X^{321}$ and $X^{322}$ is a covalent bond, and $E^{321}$ forms a urethane bond together with $X^{325}$, and $E^{322}$ forms a urethane bond together with $X^{326}$) or a bivalent group derived from a diisocyanate selected from the group consisting of saturated aliphatic, alicyclic and aromatic diisocyanates (provided that in this case, each of $X^{321}$ and $X^{322}$ independently represents an oxygen atom or an alkylene glycol group, and $E^{321}$ forms a urethane bond together with $X^{321}$ and $X^{325}$, and $E^{322}$ forms a urethane bond together with $X^{322}$ and $X^{326}$); each of $X^{325}$ and $X^{326}$ independently represents a group of the formula V as defined in claim 1; e is an integer of from 1 to 1500 and f is an integer of from 0 to 1499, provided $e+f \leq 1500$.

5. The soft ocular lens material according to claim 1, wherein the alkyl (meth)acrylate (B) is at least one member selected from the group consisting of methyl (meth)acrylate, ethyl (meth)acrylate, propyl (meth)acrylate, isopropyl (meth)acrylate, butyl (meth)acrylate, tert-butyl (meth)acrylate, isobutyl (meth)acrylate, pentyl (meth)acrylate, tert-pentyl (meth)acrylate, hexyl (meth)acrylate, heptyl (meth)acrylate, octyl (meth)acrylate, 2-ethylhexyl (meth)acrylate, nonyl (meth)acrylate, decyl (meth)acrylate, dodecyl (meth)acrylate, stearyl (meth)acrylate, cyclopentyl (meth)acrylate, and cyclohexyl (meth)acrylate.

6. The soft ocular lens material according to claim 1, wherein the alkyl (meth)acrylate (B) is an alkyl (meth)acrylate, of which the glass transition temperature of a homopolymer with a molecular weight of at least about 10,000, would be not higher than 40° C.

7. The soft ocular lens material according to claim 1, wherein the alkylene glycol group for each of $X^{11}$, $X^{12}$, $X^{21}$, $X^{22}$ and $X^{23}$ is a group of the formula IV:

$$-O+C_kH_{2k}-O)_l \qquad (IV)$$

wherein k is an integer of from 2 to 4, and l is an integer of from 1 to 5.

8. The soft ocular lens material according to claim 1, wherein $R^{41}$ in the formula V is a trivalent hydrocarbon group of the formula VI:

$$+CH_2)_s-CH+CH_2)_t- \qquad (VI)$$
$$\underset{|}{(CH_2)_u}$$

wherein s is an integer of from 0 to 5, t is an integer of from 0 to 5, and u is an integer of from 0 to 5, provided s+t+u is an integer of from 0 to 5.

9. The soft ocular lens material according to claim 1, which further contains at least one member selected from the group consisting of from 0.01 to 10 parts by weight of a cross-linking agent, not more than 30 parts by weight of a reinforcing monomer, not more than 30 parts by weight of an oxygen-permeability-imparting monomer, not more than 3 parts by weight of a polymerizable ultraviolet absorber, not more than 3 parts by weight of a polymerizable dyestuff and not more than 3 parts by weight of a polymerizable ultraviolet absorbing dyestuff, per 100 parts by weight of the total amount of the essential components (A), (B), (C) and (D).

10. The soft ocular lens material according to claim 1, which is subjected to alkali treatment.

11. A soft ocular lens obtained by shaping the soft ocular lens material of claim 1 into a desired shape, followed by alkali treatment.

* * * * *